US009691307B2

(12) United States Patent
Braunstein

(10) Patent No.: US 9,691,307 B2
(45) Date of Patent: Jun. 27, 2017

(54) APPARATUS REAL TIME CONTROL AND NAVIGATION SYSTEM USING NETWORKED ILLUMINATED SIGNS IMPROVING SAFETY AND REDUCING RESPONSE TIME OF FIRST RESPONDERS

(71) Applicant: Zachary Leonid Braunstein, San Marcos, CA (US)

(72) Inventor: Zachary Leonid Braunstein, San Marcos, CA (US)

( * ) Notice: Subject to any disclaimer, the term of this patent is extended or adjusted under 35 U.S.C. 154(b) by 435 days.

(21) Appl. No.: 14/475,911

(22) Filed: Sep. 3, 2014

(65) Prior Publication Data
US 2015/0130350 A1 May 14, 2015

Related U.S. Application Data

(60) Provisional application No. 61/875,567, filed on Sep. 9, 2013, provisional application No. 61/894,130, filed on Oct. 22, 2013.

(51) Int. Cl.
*H05B 37/02* (2006.01)
*G09F 13/00* (2006.01)
(Continued)

(52) U.S. Cl.
CPC ............ *G09F 13/005* (2013.01); *G09F 13/04* (2013.01); *G09F 13/22* (2013.01); *H02J 9/02* (2013.01);
(Continued)

(58) Field of Classification Search
CPC .... G09F 13/04; G09F 13/22; G09F 2013/222; G09F 13/005; G09F 2013/0459;
(Continued)

(56) References Cited

U.S. PATENT DOCUMENTS 6,140,943 A * 10/2000 Levine ............... G01C 21/3647
340/905
7,101,056 B2 * 9/2006 Pare ........................ G09F 13/14
362/190
(Continued)

FOREIGN PATENT DOCUMENTS

WO     WO 9939319 A2 *  8/1999   ............... G09F 9/33

*Primary Examiner* — Tuyet Vo
*Assistant Examiner* — Amy Yang

(57) ABSTRACT

Apparatus networked system of intelligent devices including illuminated street signs. Street signs include: address, name, direction and message signs. Apparatus controller interfacing: sensors, street signs, operator, remote controllers. Interface includes: wireless network and INTERNET. Controller maintains status of a community, including: ambient environment, safety and status of routes within the community. Status provided by: sensors, authorized operator, remote controllers. Apparatus based on respective status executes control algorithm of street signs providing general illumination and visual information, improving safety within the community. Additionally, during emergency status, controller performs emergency control of illuminated street signs, including: direction signs, message signs, and the controls include manipulating illumination features of respective street signs with an objective to provide real-time visual navigation to minimize response time of first responders entering the community and reaching location in need of help. Apparatus configuration including closed-loop control system operating within optimization criteria and retaining functionality during power outage.

21 Claims, 11 Drawing Sheets

Figure 1:
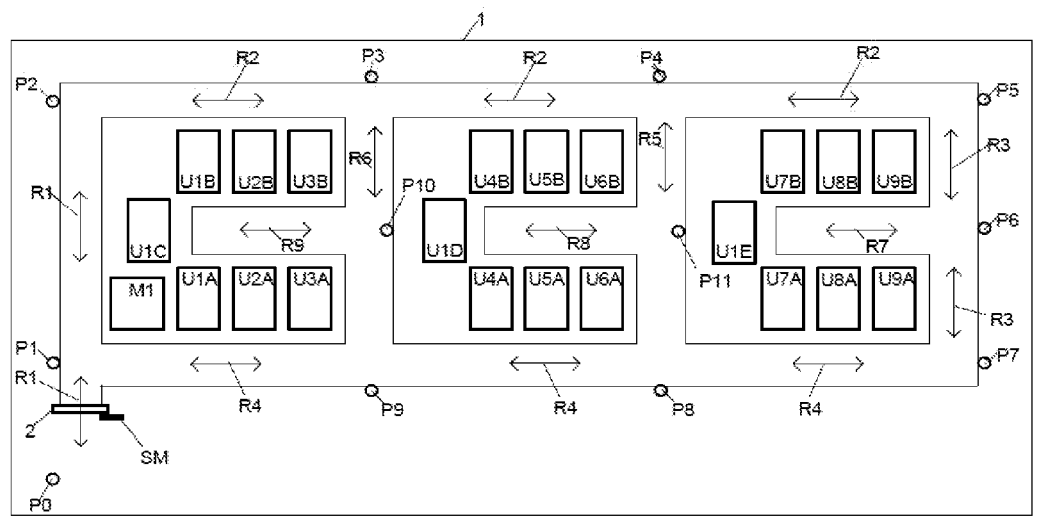

(51) Int. Cl.
*G09F 13/22* (2006.01)
*G09F 13/04* (2006.01)
*H02J 9/02* (2006.01)

(52) U.S. Cl.
CPC ............... *G09F 2013/0459* (2013.01); *G09F 2013/222* (2013.01); *H05B 37/0218* (2013.01); *H05B 37/0227* (2013.01); *Y02B 10/72* (2013.01)

(58) Field of Classification Search
CPC ............ H05B 37/0227; H05B 37/0218; Y02B 10/72; H02J 9/02
USPC ................................ 315/186, 193, 297, 291
See application file for complete search history.

(56) References Cited

U.S. PATENT DOCUMENTS

| | | | |
|---|---|---|---|
| 2008/0039120 A1* | 2/2008 | Gad ...................... | G01C 21/20 455/456.2 |
| 2011/0001438 A1* | 1/2011 | Chemel ............... | H05B 37/029 315/297 |
| 2012/0262074 A1* | 10/2012 | Wang .................. | H05B 33/083 315/186 |

\* cited by examiner

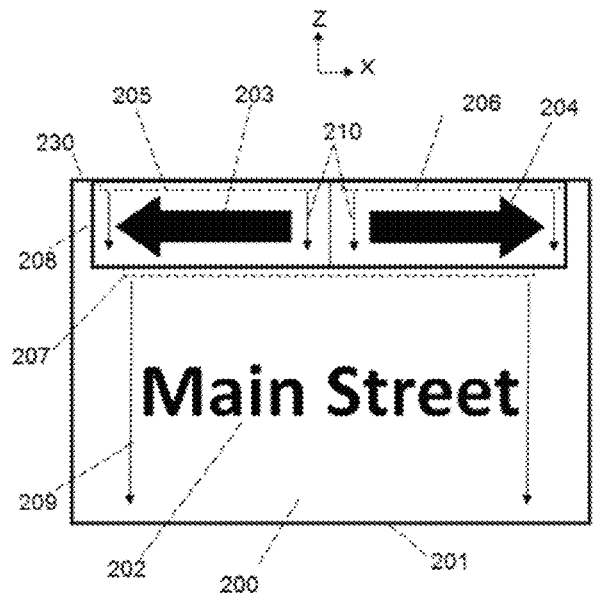 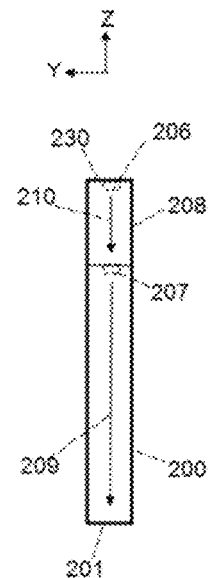
FIG. 10  FIG. 11
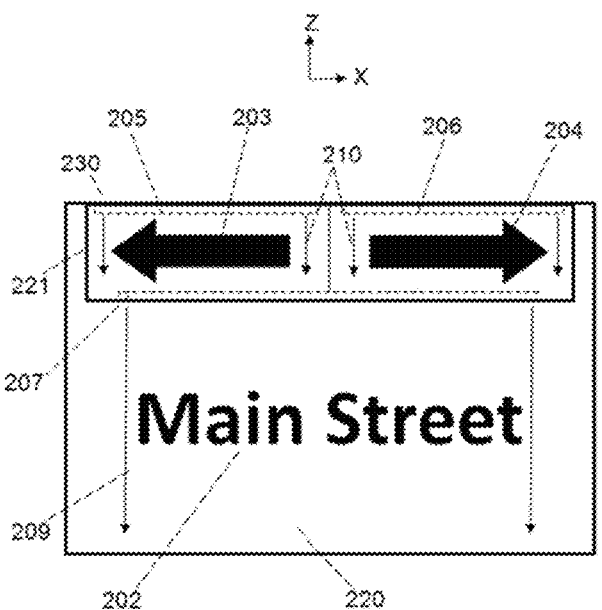 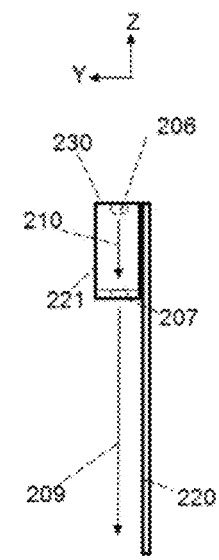
FIG. 12  FIG. 13

APPARATUS REAL TIME CONTROL AND NAVIGATION SYSTEM USING NETWORKED ILLUMINATED SIGNS IMPROVING SAFETY AND REDUCING RESPONSE TIME OF FIRST RESPONDERS

2.0 CROSS-REFERENCE TO RELATED APPLICATIONS

I claim the benefits of Provisional Application No. 61/875,567 filed on Sep. 9, 2013, title "Apparatus Real Time Control and Navigation System Using Networked Intelligent Illuminated Street Address and Directional Signs to Reduce Response Time of First Responders" and Provisional Application No. 61/894,130 filed on Oct. 22, 2013, title "Apparatus Intelligent LED illuminated Sign, Methods of Configuration and Controls".

3.0 STATEMENT REGARDING FEDERALLY SPONSORED RESEARCH OR DEVELOPMENT

Not applicable.

4.0 REFERENCE TO SEQUENCE LISTING, A TABLE, OR A COMPUTER PROGRAM LISTING COMPACT DISK APPENDIX

Not applicable

5.0 BACKGROUND OF THE INVENTION

There a rather significant number of residential street name signs, and in particular, street address signs which are very hard to identify. In the evening and night hours the problem is clearly impacting the safety of a community, as it creates unnecessary stress, in particular when an individual operating a vehicle is forced to "wonder" around trying to find the destination address, and as result, may cause an accident. In addition, the problem affects the RESPONSE TIME of first responders, loosing valuable time in finding a location in need of help. The problem is further complicated when an emergency is taking place at a crowded condominium or apartment complex, where location of the unit in need for help is embedded deep into the community with a complicated layout, with a number of routing options available to reach the unit in need of help. The state of the art dispatch systems in the event of emergency will assign first responders to an emergency, and then dispatch them from their station as soon as possible. On-board system, including navigation, will lead the first responder's crew to the destination general address, including an apartment complex main street address number. When inside the complex, the first responders will need to determine the most optimum, in terms of time, route to reach the location in need for help. This process is complicated, in particular during evening and night hours. Lack of visible address signs on each unit within the complex, and in addition, not being aware of the latest up-to-date status of a particular route the responders are considering to use, including a road construction prohibiting the use of the route, can delay the response time by several minutes.

A system of networked intelligent illuminated street signs, including street names, street addresses, street directional signs, and street message signs under directions of the system host controller as described in this application solves the problem. For a residential complex, as example, the system controller maintains automatically through sensors or in combination with assistance from an operator, information of the up-to-date status of all roads within the complex. During emergency and other events, the system will coordinate status of illuminated street signs, including street names, street addresses, directional signs and street message signs, to provide clear and precise directional information for responders to reach the target within the complex as soon as practically possible.

The network configuration includes any combination of wired and/or wireless topology, including INTERNET, mobile device networks.

The system configurations includes respective sensors installed within the complex, or with assistance of an operator providing status information to the host controller via provided user interface.

The system controller configuration includes combination of local and/or remote controllers connected to the network.

The directional signs configuration includes installations along the available routes, and when needed, only the ones established by controller leading to the target location within the shortest time possible, will be illuminated and controlled to direct the responders along the route selected by the controller.

When several first responders are operating within a complex, the system controller will assign specific directional colors to each of the responder crew, and inform them. For example, first responder crew number 1 would be assigned directional signs with red color, first responder crew number 2 would be assigned directional signs with green color, first responder crew number 3 would be assigned directional signs with blue color. When several responders are operating within a complex, the controller will coordinate the timing and navigational signs to achieve the most optimum results in terms of attending to respective emergency locations within the complex.

The controller configuration includes interface with the network of the complex security, and perform as an additional resource available to the security system, or compliment the security system with its stand-alone controls.

Illumination signs configuration include configurations consisting of flex single or multi-color LED strips further configured to illuminate street name signs within the complex and as result make them visible during evening and night hours.

6.0 BRIEF SUMMARY OF THE INVENTION

The apparatus described in this application is intended to improve safety of a community on a daily basis, and also reduce the response time of first responders in the event of emergency.

The apparatus configurations include configurations consisting of: intelligent illuminated signs, controllers and networks, which are described in this application. The apparatus includes configurations also described in my applications the U.S. Pat. No. 8,099,261 "Low Cost Solid-State Identification Devices", and non-provisional application number U.S. Pat. No. 14,455,928 "Apparatus Intelligent Illuminated Sign, Methods of Configuration and Controls". The apparatus by making the street signs visible at all times will help to improve safety of a community where it is installed. In addition, the apparatus configured with real-time networked navigation system will help first responders in their line of duty as they are attending to an emergency within a community.

The apparatus configurations include maintaining up-to-date status of all routes within the complex it is installed in.

During emergency situations, and as needed, an entry control algorithm will be executed in real-time by controller with or without assistance of the operator, and controls over the complex network, including INTERNET, will include commands sent by controller to individual illuminated street address signs, directional signs and message signs with an objective to provide clear and precise information as real-time navigation within the complex to the first responders attending to an emergency within the complex, assisting first responders to reach the target within the complex as soon as practically possible. Upon completion of emergency services, and as needed, an exit control algorithm will be executed in real-time by controller with or without assistance of the operator, and controls over the complex network, including INTERNET, will include commands sent by controller to individual illuminated street signs including street names, street addresses signs, directional signs and message signs, with an objective to provide clear and precise information as real-time navigation within the complex to the first responders attended to an emergency within the complex, assisting first responders to reach the exit of the complex from the target location within the complex as soon as practically possible.

The apparatus configurations include a configurable controller, which communicates with a remote HOST via wired or wireless interfaces, including INTERNET, and the controller to control the apparatus and execute control commands sent by the HOST in real time. The control includes configuration of functions and commands which are scheduled or executed in real time, and include any combination from the list below:

a) Communication with other systems, including security, installed within the complex, as part of integrating all controls for best results for the community b) Selecting a specific illuminated street address sign and controlling its illumination parameters including: light intensity, light color, light special effects, power ON/OFF c) Selecting a specific illuminated street directional sign and controlling its illumination parameters including: light intensity, light color, light special effects, power ON/OFF d) Selecting a specific illuminated street name sign and controlling its illumination parameters including: light intensity, light color, light special effects, power ON/OFF e) Selecting a specific illuminated street message sign and controlling the message it is displaying, including configuration for displaying a static message and configuration for displaying real-time dynamic messages, and controlling illumination parameters including: light intensity, light color, light special effects, power ON/OFF f) Monitoring via sensors status of selected parameters within the complex, including: obstructions on the routes within the complex; presence and levels of ambient light at different locations within the complex; detection of stationary and/or moving objects within the complex g) Monitoring via sensors vital electrical parameters of the apparatus itself, and the availability of electricity within the complex, and as required, switching automatically to stand-by power resources, including battery packs and solar battery, to continue operations when there is a partial a complete power outage within the complex, while optimizing utilization of backup power to extend its operations for as long as possible. The controls of light intensity for each illuminated sign within the system can be adjusted automatically to maintain the signs clearly visible, while minimizing the use of electricity.

e) Based on information obtained from sensors, executing in real-time without operator assistance a predefined algorithm stored in the non-volatile memory of the controller to achieve criteria defined and stored in the HOST non-volatile memory, and criteria including: safety of apparatus and all devices connected to apparatus; standard power availability to a connected devices; backup power availability to a connected devices at specified times The apparatus can be configured with a controller and sensors for monitoring the apparatus status and condition, and controller conduct apparatus self-diagnostics, and then present result to the remote HOST, and to the local operator, including report via visual and/or audible signals.

The apparatus can be configured to support functions in setting time-based events by the remote HOST and/or by local operator via apparatus user interface. Events can be configured based: on real-time calendar, sensor condition, or combination of both.

7.0 BRIEF DESCRIPTION 7.1 Drawing Content and Listing

My application contains drawings listed in Table 1, below.

TABLE 1

List of Drawings

| FIGS. | Description |
|---|---|
| 1 | 2D view of a complex layout without apparatus |
| 2 | 2D view of the complex without apparatus with emergency in unit U7B |
| 3 | 2D view of the complex layout with apparatus |
| 4 | 2D view of the complex with apparatus with emergency in unit U7B and unit U9B |
| 5 | Diagram of the complex apparatus network |
| 6 | Diagram of the complex apparatus network with emergency in unit U7B and unit U9B |
| 7 | Apparatus configured as illuminated street name sign |
| 8 | Apparatus configured as illuminated street name sign with built-in illuminated directional sigs |
| 9 | Apparatus configured as illuminated street name sign with add-on illuminated directional sigs |
| 10 | Front view, apparatus, illuminated street name sign with buiit-in illiuminated directional sigs |
| 11 | Side view, apparatus, illuminated street name sign with built-in illuminated directional sigs |
| 12 | Front view, apparatus, illuminated street name sign with add-on illuminated directional sigs |
| 13 | Side view, apparatus, illuminated street name sign with add-on illuminated directional sigs |
| 14 | 3D view apparatus configured as illuminated street address sign |
| 15 | 3D view apparatus, details illuminated street address sign with replaceable display |

TABLE 1-continued

List of Drawings

| FIGS. | Description |
|---|---|
| 16 | 3D view apparatus, details illuminated street address sign |
| 17 | 3D view apparatus configured as illuminated street address sign with non-replaceable display |
| 18 | Diagram, apparatus real time control and navigation system |
| 19 | Front view, apparatus, illuminated street name sign |
| 20 | Side view, apparatus, illuminated street name sign |
| 21 | Example: illuminated street message sign, displaying WARNING message |
| 22 | Example: illuminated street message sign, displaying ATTENTION message |
| 23 | Front view, apparatus, illuminated street dual direction sign |
| 24 | Side view, apparatus, illuminated street dual direction sign |
| 25 | Front view, apparatus, illuminated street single direction sign |
| 26 | Side view, apparatus, illuminated street single direction sign |

7.2 Drawing Convention and Format

Drawings with this application, in addition to USPTO requirements, are:

a) Not to scale.

b) Dashed lines are used for outlining a group of parts, sub-assemblies and assemblies, which can be identified by unique number as a sub-assembly or as an assembly 7.3 Definitions My application contains definitions of specific components or processes, which are listed below. Definitions are used and expanded in greater details in later paragraphs.

Ambient Light Sensor

Defined as a Sensor which detects level of ambient light, and generate signal proportional or representing levels of ambient light. The apparatus configuration includes provision for a sensing window, allowing the ambient light sensor to be exposed to ambient light. Ambient light sensor is connected to the controller of the apparatus. Controller will measure the signal generated by the ambient light sensor and based on specifications of the ambient light sensor, calculate amount of ambient light present. Controller performs controls associated with preset trigger points of the ambient light sensor. Ambient light sensor configuration includes interface between operator and controller. By blocking the sensing window of the ambient light sensor preventing the ambient light reaching the sensor, the operator can trigger the status of the ambient light sensor between two states: state 1—ambient light present at a level above preset minimum level; state 2—ambient light is not present, or is below the preset minimum level limit. By triggering these states at predefined sequences, operator can execute commands related to apparatus: configurations and controls.

Backlighting

Defined, as a method of positioning illumination devices, including solid state, behind a surface, which is required to be illuminated. Backlighting can be used for:

a) General Illumination of an entire or a selected section of a surface, which can include an in-printed Symbol or Symbols. An example: Backlighting of a rectangular section of a transparent flat surface, including clear plastic, which can have in-printed or silk-screened in black color Symbols, including—alpha-numeric characters. As result, the Symbols can stand-out in black color, while the remaining area of the selected section cold be illuminated by solid state devices, including white or light color LED's, to enhance the visibility of the black Symbols.

b) Symbol illumination, when respective illumination devices, including solid state, can be mounted behind along the outline of a Symbol or selected Symbols in-printed on a colored surface, with Symbols outline signified by in-contrast in transparent or lighter color. An example: a transparent plastic surface, with sections painted in light color, while the outline of a Symbol or Symbols not painted, i.e. remained—transparent. Backlighting in a form of white or color LED's can be mounted along the outline of the Symbols, enhancing Symbol presence in contrast to the surrounding area.

c) Or combination of General and/or Symbol illumination of selected sections of a given surface with a number of Symbols in-printed, which via illumination parameters, including: intensity, color, can further enhance, visibility of Symbols on a given surface.

Battery

Defined as a battery which can be configured as a conventional battery pack, or solar battery, or another power storage device within required power specifications.

Controller

Defined as an intelligent device, which can be installed on a PC board, including flexible PCB, which can house components, including: electronic Control devices—embedded controllers and support electronics; Light Sources, including LED's; communication electronics for wired and/or wireless communications with a remote host computer, other Modules; sensors which detect change in exterior lighting, and which are used by Controller to optimize required illumination intensity; sensors which detect ambient temperature, and which are used by Controller to optimize amount of drive power of illumination components; sensors which detect motion of an object, and are used by Controller for add-on security feature—to either acknowledge the event, or sound an alarm of an intruder; driver electronics which are used to power electronics and other devices; sensors, which are used for remote control; interface connectors. The Controller configuration parameters include: size, thickness, shape to meet requirements of a specific application. Controller power source includes power sources with respective DC power specifications (voltage, current, ripple, temperature range): AC-DC power converters; solar energy collection technology based DC power source; batteries. Controller configurations include interface to remote devices, including: remote Controller via LAN; other devices, including activation relays via direct wiring interfaces; with an objective to provide required level of control for a specific application. Controller configurations include monitoring status of Sensors, and based on embedded algorithm executing controls in real-time to attain acceptance criteria stored in the controller memory. Controller can be configured to include interface for local operator, and support operator ability to preset control functions. Controller can be configured to include self-diagnostics and report its status to remote HOST and local operator via visual and voice signals.

Communication Interface

Defined as serial communications between Controller and variety of devices within the apparatus and remote devices outside the apparatus, including: remote computer, remote Controller, remote Module, Communication Interface includes standard communication platforms, including: RS232, USB, wireless technologies, including cellular, INTERNET. Communication Interface configurations include support for multi-drop LAN, which allow connection of several Controllers via LAN to remote computer, or Controller.

Control Function

Defined as a function, which is executed by a Controller upon occurrence of an event, including: direct request by an user via wireless remote control device; condition when a specific Trigger Point of a Sensor has been reached; request by a remote Controller over LAN. Control Function includes: tuning ON/OFF devices.

Designated Area

Defined as an area which is configured for illumination by Illumination Devices. Designated Area can be a section or sections selected on the Front Panel. Light Retainer and Light Control components can be used to direct illumination from Illumination Devices toward Designated Area(s). Designated Area can be used to illuminate required Symbol(s).

Identification System

Defined as System, which is configured of a number of Identification Devices, Modules, and other control and support components. Devices and/or Modules within a System can be interfaced via designated and/or industry standard technologies, including wired or wireless LAN. A System, which can be controlled by a host computer over LAN, can be used for identification purposes, which can include: identification, warning, emergency.

Illumination Control

Defined as control of the illumination components of the apparatus. The configuration of the controller of the apparatus includes control of illumination devices, including light parameters: intensity, color, special effects.

Illumination Parameters

Defined as a variety of Light Control parameters affecting the illumination produced by illumination devices of the apparatus. Illumination Parameters include: illumination ON/OFF control; illumination intensity; illumination color; illumination cycling ON/OFF at selected frequency with respective selection of ON-cycle and OFF-cycle; illumination sequence.

Illumination Device

Defined as a solid-state device, including LED.

Illumination Panel

Defined as a panel placed in front of illumination Device(s). Configuration of the illumination panel include Symbol(s) placed on any side of the panel.

Light Control

Defined as electronic Control of Light Parameters including controls of an individual solid-state Light Source, or controls of a group of solid-state Light Sources. The Controller configuration includes light controls including:

a) Cycling ON/OFF with stable or variable—ON-time, OFF-time, cycling frequency b) Dynamically changing drive power, including changing either voltage, or current, or both, which can increase illumination Intensity c) Applying Controls listed in (a) dynamically to a group of Lights in one direction, or changing directions d) Dynamically changing selected group of Lights in terms of their location and number of Lights within a group Light Controller Defined as a controller, which is configured to execute required Light Control functions in respect to illumination devices of the apparatus. The functions can be requested by a host controller within the apparatus, an operator or a remote host computer.

Sensor

Defined as a component or device within the apparatus, which is configured to sense a specific parameter including: power parameters (voltage, current), ambient parameters (temperature, humidity). Sensor is interfaced to control electronics, including controller. Sensor configuration includes sensor-specific Trigger Points or set levels, including set levels programmed by an user, and which are stored in a non-volatile memory of the Controller. The Controller in real-time monitors Sensors, and detects condition when a respective Trigger Point has been reached Controller configuration includes executing a Control Function, as programmed or set by an user, when a specific Trigger Point or combination of Trigger Points has been detected. Sensor configuration includes monitoring specific parameter of the apparatus, including: power parameters (voltage, current), ambient parameters (light, temperature, humidity, motion). Sensor configuration includes wireless interfacing to control electronics.

Symbol

Defined as any single or combination of: alpha character, numeric character, art. Symbol configuration includes attachment of the symbol to the illumination panel by means of: silk-screening, printing, painting, gluing.

Trigger Points

Defined as an user set or pre-programmed level or value associated with a specific Sensor, which is detected by Controller. Trigger Points are stored in a non-volatile memory of Controller. Controller in real-time monitors Sensors, and detects condition when a respective Trigger Point has been reached. Controller executes a Control Function, as programmed or set by an user, when a specific Trigger Point or combination of Trigger Points has been detected.

8.0 DRAWINGS

The intelligent configurable apparatus, including configuration consisting of devices: intelligent illuminated modules, sensors, controllers and networks, which are described in this application. For reference, some of the devices and their configurations are described in my applications the U.S. Pat. No. 8,099,261 "Low Cost Solid-State Identification Devices", and non-provisional application U.S. Ser. No. 14/455,928 "Apparatus Intelligent Illuminated Sign, Methods of Configuration and Controls". The apparatus by making the street signs visible at all times will help to improve safety of a community where it is installed. In addition, the apparatus configured with real-time networked navigation system will help first responders in their line of duty to reduce the response time as they are attending to an emergency within a community.

Unless noted otherwise, for simplicity: solid state illumination devices will be referenced as LED's; the illumination produced by LED's will be substantially parallel to an observer standing in-front of a sign; not all elements of the apparatus are shown.

The apparatus can be configured to contain multiple apparatuses with each of the apparatus having the same or different configuration, and referenced as a system.

The apparatus is designed to meet specifications requirements, including ambient ratings and compliance to regulations of local and national agencies.

Figure 3:
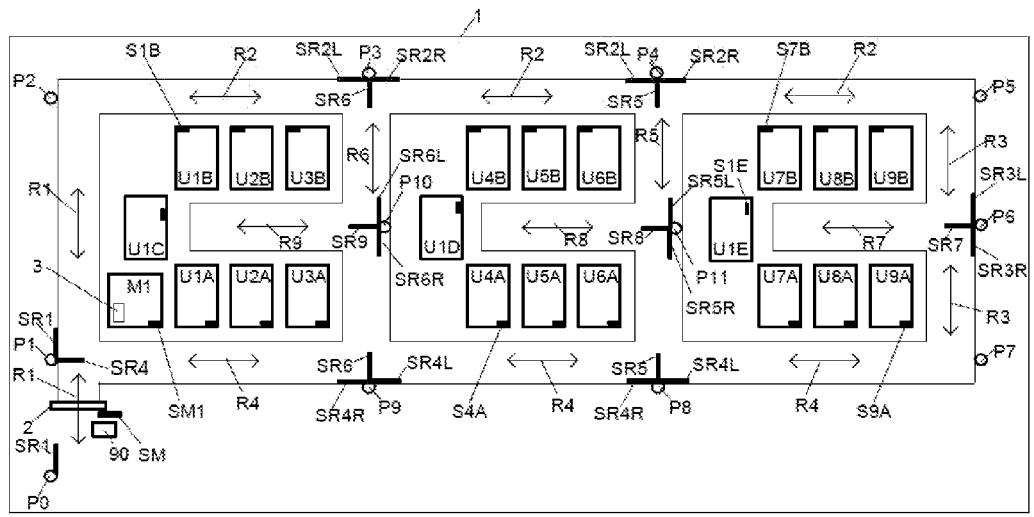

Starting with FIG. 3, various configurations of the intelligent modular configurable apparatus are shown. The apparatus is also referenced as a system, and for simplicity not all components of the system are shown. The configuration of the intelligent modular configurable apparatus include configuration, which includes: at least one configurable intelligent illumination module; at least one configurable solid-state light source; at least one configurable display; at least one configurable sensor; at least one configurable power source; at least one configurable module controller; at least one configurable host controller; at least one configurable network; at least one configurable acceptance criteria. The at least one intelligent illumination module can be configured to provide illumination, including illumination for the at least one configurable display. The at least one solid-state light source can be configured to provide illumination for the at least one illumination module, and the light source providing illumination in a direction which is substantially parallel to an observer standing in front of the illumination module of the apparatus. The at least one sensor can be configured to monitor environment, including environment within the apparatus. The environment monitored by the sensors include: ambient light, temperature, power source. The at least one module controller can be configured to connect with the at least one solid-state light source. The controller can be further configured for monitoring and controlling operation of the light source. The at least one module controller can be configured to connect with the at least one sensor, and the controller can be further configured for monitoring status of the sensor. The at least one power source can be configured to power the apparatus. The power source configurations include conventional DC power supply, battery, and solar battery, and any combination of. The at least one module controller can be configured to execute a control algorithm. The control algorithm includes configuration of the algorithm maintaining operation of the apparatus within the at least one acceptance criteria. The acceptance criteria include status and trigger level points for the sensors, which are used by the algorithm and the controller, and maintain operation of the apparatus within acceptance criteria. The acceptance criteria are configured to include specifications parameters of components comprising the apparatus. The control algorithm includes configuration supporting use of the components comprising the apparatus within the respective component specification requirements. The at least one host controller can be configured to execute system control algorithm. The system control algorithm includes interface between the at least one host controller and the at least one module controller. The interface including the at least one configurable network. The system control algorithm also includes configuration maintaining operation of the apparatus within the at least one acceptance criteria. The at least one acceptance criteria includes configuration criteria for a device within the apparatus. The devices include the at least one intelligent illuminated module. The system comprises of devices of the apparatus, and the system including the at least one host controller, the at least one intelligent illuminated module, and the at least one network. The at least one acceptance criteria includes configuration of a system acceptance criteria for the apparatus. The system acceptance criteria include configuration requiring a coordinated control of the devices within the apparatus, and the system providing visual real-time navigation between the intelligent illuminated modules. The system acceptance criteria include configuration minimizing distance of the visual navigation between the intelligent illuminated modules. The system acceptance criteria include configuration minimizing time of the visual navigation between the intelligent illuminated modules; said system control algorithm including configuration maintaining operation of the apparatus within acceptance criteria. The apparatus is installed in a community, and the community defined as an area within a city; a condominium complex; an apartment building.

The application also describes two methods of controlling the apparatus. For simplicity the methods are identified or referenced as method #1 and method #2. The method #1 is aimed at improving safety within a community, and the method #2, in addition to the method #1, includes reducing the response time for the first responders attending to a location within the community.

The method #1 for improving safety of a community is based on improving visibility of street signs within a community during evening and night hours. The method #1 includes configuration of: street name signs, street address signs and street message signs. The method #1 implementation steps include:

1) Programming the least one configurable intelligent illumination module, and the programming including configuration and control algorithm. The configuration including acceptance criteria. The control algorithm including control of the module sustaining operation of the module within the acceptance criteria. The programming including an authorized operator.

2) Configuring the at least one intelligent illumination module for illuminating a configurable street sign. The sign configuration including street name sign, street address sign, street message sign. The configuring of the at least one power source to provide power to the at least one intelligent illumination module during a power outage. The configuring of the at least one module controller for monitoring status of ambient environment. The controller monitoring status of the module, including self-diagnostics of electronics within the module. The controller executing controls, including the controls of the at least one solid state illumination source of the module.

The method #2 includes enhancements to the method #1, and the enhancements further improving safety of the community, and in addition, the enhancements are reducing the response time for the first responders attending to a location within the community. The method #2 not only improves visibility of signs within a community, but also adds important functionality, including:

a) Monitoring and reporting status of the routes and status of the units within the community;

b) Providing real-time visual navigation within the community, which is available to authorized users including first responders, with an objective to minimize time in reaching a location within the community.

The method #2 includes the at least one intelligent modular configurable apparatus, and the method consisting of:

1) Programming the apparatus. The programming including programming of a at least one device within the apparatus, and programming of at least one system within the apparatus. The system comprising system devices, including a system controller. The programming including system configuration and control algorithm. The system configuration including system acceptance criteria. The system control algorithm including sustaining operation of the system within the acceptance criteria. The programming including operator. The control algorithm including configuration of an interface between the system controller and the at least one intelligent illumination module. The interface including wireless network for mobile devices. LAN and INTERNET;

2) Configuring the system for providing real-time visual navigation within a community. The navigation including configuration of the devices within the system; said devices including the at least one intelligent illumination module; said intelligent illumination module is a configurable street sign; said sign configuration including street name sign, street address sign, street directional sign, street message sign; said configuration including:
   a) Identifying within the community location of street name signs which are not clearly visible during evening and night hours, and installing the intelligent illumination modules configured for illuminating street name signs;
   b) Identifying within the community location of street address signs which are not clearly visible during evening and night hours, and installing the intelligent illumination modules configured for illuminating street address signs;
   c) Identifying within the community location of street intersections which are not clearly visible during evening and night hours, and installing the intelligent illumination modules configured for illuminating street name signs, and the street name signs including illuminated directional signs;
   d) Identifying within the community location and installing illuminated street message signs, which can be configured to provide valuable information, including: route status and safety status within the community;
   e) Configuring the at least one host controller, and the configuration including the system acceptance criteria and the system control algorithm;
   f) Configuring power distribution, including plug and power, to the system, and the power distribution maintaining operation of selected devices within the system during a power outage;
   g) Configuring sensors within the community, and the sensors providing a status; said status including: ambient environment, street access, address status;
   h) Configuring the interface, including the interface between the devices of the system and the interface between the system and at least one external controller outside the system; said external controller including a remote host controller, a remote portable device;
   i) Configuring the acceptance criteria for the system;
   j) Configuring and programming the controllers, including the host controller; said programming including a control algorithm;
   k) The control algorithm including real-time controls of the devices within the system, and the algorithm including the interface of the system with an operator and the remote controllers;
   l) The control algorithm including real-time controls sustaining operation of the system within the acceptance criteria;
   m) The configuration of the acceptance criteria including at least one control target;
   n) The at least one control target including a single requirement or combination of the following requirements:
      1) Maintaining operation of the system within manufacturer specifications;
      2) Improving visibility of the street signs within the community;
      3) Maintaining up-to-date status of available routes within the community;
      4) Based on the status of routes within the community identifying the route providing the shortest path between locations within the community identified by the system;
      5) Based on the status of routes within the community identifying the route requiring the shortest time in reaching between locations within the community identified by the system;
      6) Providing to an authorized user real-time visual navigation between locations within the community identified by the system;
      7) Downloading to a mobile device of an authorized user real-time navigation between locations within the community identified by the system;
      8) Based on the status of a unit within the community, controlling the system, including controls of the illuminated street address sign of the unit; said controls enhancing visibility of the street address sign of the unit; said controls providing visual effects reflecting the status of the unit within the community;
   o) The system including configuration supporting closed-loop real-time controls operating within configured acceptance criteria without an operator assistance:

FIG. 1 illustrates a layout of a complex, as an example, prior to installation of the apparatus. The complex is shown without illuminated street address signs for the units within the complex. The main street address sign of the complex may have illumination. Each unit within the complex may have a general outdoor light placed over the unit street address number, to make it more visible during evening and night hours. The complex will be used to illustrate the current problem, which includes:
   1) General difficulties in finding an unit within a complex during evening and night hours, which impacts the safety in the area. Inability to clearly see the street signs during evening and night hours, imposes additional stress on individuals in need of finding a location within the complex. The stress can lead to a traffic accident within the complex, in particularly in the case of a new visitor to the complex operating a vehicle and not able to see the street signs.
   2) In emergency—difficulties of finding the unit experiencing an emergency during evening and night hours. In addition, the first responders attending to the emergency, not being aware of the latest status of routes within the complex, may take the wrong route, including the one being under construction, and as result, will need to pull back. The combined problem may delay the response time of the first responders in reaching the unit experiencing the emergency. The delay may amount to several minutes, which may be critical when attending a health related emergency. The delay may also contribute to a significant loss in property damage, which can occur during an emergency, including: fire, water leak. The elements of the FIG. 1 are labeled per Tables 2, 3, 4 and 5 below.

TABLE 2

| Label | Description |
|---|---|
| SM | Street Address Sign for the complex |
| 1 | Complex |
| 2 | Main Gate |

The Street Address Sign for the complex (SM) includes configurations as an intelligent illuminated street address sign, and can be further configured to include real-time display of the status related to the complex, which is updated by the host controller (3) of the complex.

As shown on FIG. 1. The complex is labeled (1), and the main gate to the complex (1) is labeled as (2).

TABLE 3

| Label | Description - Street Names Identifiers |
|---|---|
| R1 | Route 1 |
| R2 | Route 2 |
| R3 | Route 3 |
| R4 | Route 4 |
| R5 | Route 5 |
| R6 | Route 6 |
| R7 | Route 7 |
| R8 | Route 8 |
| R9 | Route 9 |

As shown on FIG. 1. there are total of 9 routes within the complex, labeled respectively (R1) through (R9). The routes are intersected as shown. Each route may require maintenance time to time, and as result, may not be available at all times.

TABLE 4

| Label | Description Street Address identifiers |
|---|---|
| M1 | Main Office labeled M1 |
| U1A | Unit 1A |
| U2A | Unit 2A |
| U3A | Unit 3A |
| U4A | Unit 4A |
| U5A | Unit 5A |
| U6A | Unit 6A |
| U7A | Unit 7A |
| U8A | Unit 8A |
| U9A | Unit 9A |
| U1B | Unit 1B |
| U2B | Unit 2B |
| U3B | Unit 3B |
| U4B | Unit 4B |
| U5B | Unit 5B |
| U6B | Unit 6B |
| U7B | Unit 7B |
| U8B | Unit 8B |
| U9B | Unit 9B |
| U1C | Unit 1C |
| U1D | Unit 1D |
| U1E | Unit 1E |

As shown on FIG. 1. there are total of 21 units within the complex, labeled respectively to their locations within the complex as: (U1A) through (U9A); (U1B) through (U9B); (U1C) through (U1E); and the main office building labeled (M1).

TABLE 5

| Label | Description Lighting Poles |
|---|---|
| P0 | Main Pole at the front Gate entry to the complex |
| P1 | Pole 1 |
| P2 | Pole 2 |
| P3 | Pole 3 |
| P4 | Pole 4 |
| P5 | Pole 5 |
| P6 | Pole 6 |
| P7 | Pole 7 |
| P8 | Pole 8 |
| P9 | Pole 9 |

As shown on FIG. 1. there are total of 9 light poles within the complex, labeled respectively to theft locations within the complex as: (P1) through (P9). The light poles will provide illumination of the area underneath the pole, and the light pole itself can be used to place street name tags for each route within the complex. Figure elements detailed description:

R1—Route leading from the front gate (2) of the complex to inside of the complex R2—Route providing access to units U1B through U9B R3—Route providing access to R2, R7 and R4

R4—Route providing access to units U1A through U9A

R5—Route providing access to R2, R8 and R4

R6—Route providing access to R2, R9 and R4

R7—Route providing access to unit U1E, and access from the back to units U7A through U9A, and U7B through U9B R8—Route providing access to unit U1D, and access from the back to units U4A through U6A, and U4B through U6B R9—Route providing access to unit U1C, and access from the back to units U1A through U3A, and access from the back to units U1B through U3B 1—Label for the complex itself, including complex name, street address number 2—Main Gate to the complex M1—Address of the Main office of the complex U1A through U9A—Address of the units within the complex along route R4

U1B through U9B—Address of the units within the complex along route R2

U1C—Address of the unit within the complex accessible via route R9

U1D—Address of the unit within the complex accessible via route R8

U1E—Address of the unit within the complex accessible via route R7

Figure 2:
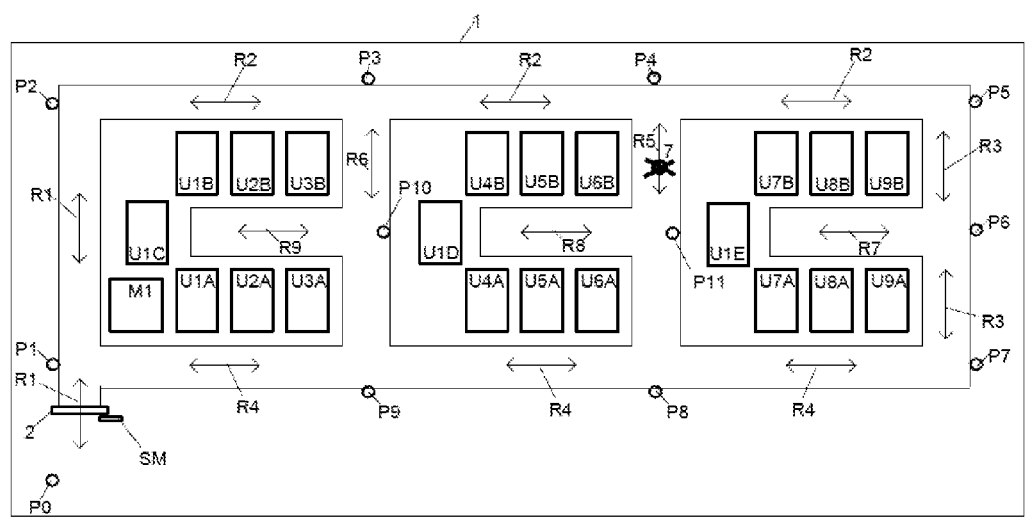

FIG. 2 illustrates a layout of the complex shown on FIG. 1, and the unit with the address U7B experiencing an emergency, as indicated by "E1", which is requiring help from the first responders. According to the complex map, the shortest route to reach the U7B would include two options.

Option 1: take R1 to R2, and locate U7B on R2.

Option 2: take R1 to R4 to R5 and R2, and locate U7B on R2. As indicated, the route R5 is under repairs or construction, as marked by the "X", and as result, not being available.

If first responders chose option 1, there is no problem. If for any reason they decide to choose option 2, there is a problem. During daytime, considering the route R5 as a very short street, the first responders will notice road obstruction on R5 right away, and will make required adjustments which will increase the response time by seconds. During the evening and night hours it would make by far more of an impact, and may delay the response time to attend to unit U7B by several minutes. The problem would be even worse, if other routes within the complex are under construction, or layout is more complicated. The first responders, in general, have no information of the latest status of the routes within a complex they need to attend for an emergency service. As result, their selection of the route path is based on the map of the complex.

Remaining elements of FIG. 2 are labeled same as on FIG. 1.

FIG. 3 illustrates a layout of the complex shown on FIG. 1 with the apparatus installed, and the apparatus is configured to include systems components as listed in the Tables 6 through 9 below. For simplicity not all devices of the apparatus are shown. The configuration of the apparatus is aimed at:

1) Improving community safety, by making the street signs, including street names, street addresses signs, message signs or message boards visible during evening and night hours
2) Providing first responders with real-time navigation in a form of intelligent illuminated street directional, street names and unit address number signs, street message signs, which are clearly visible during evening and night hours, assisting first responders to reach the target location within the complex as soon as practically possible.

In respect to community safety, visible signs will reduce stress trying to find a location, in particular when a person is operating a vehicle. For simplicity the message sign (90) is shown only at the entry of the complex, and can be configured to display information relevant to: improving safety within the community; assisting first responders entering the community. The message sign (90) can be controlled by the apparatus controller and display dynamic messages in real-time.

In respect to emergency, ability of the apparatus to control color of each sign, and to create special dynamic lighting effects (rolling colors, blinking), will allow the apparatus to navigate several independent first responder crews within the complex by assigning specific color to each crew, and informing them of that selection prior to first responders entering the complex. In addition, the message signs can display in real-time information which is aimed at improving safety of the community, and at selected locations in event of emergency, assist in real-time navigation of first responders entering the community and operating within the community. The apparatus will execute ENTRY control algorithm providing real-time navigation upon a first responder crew entering the complex, and then execute the EXIT control algorithm providing real-time navigation upon first responder completing their service within the complex, guiding them to the exit of the complex as soon as practically possible. The apparatus, consisting of controllers, sensors, will operate as a real-time closed loop control system, executing control algorithm in real-time independent of an operator to achieve the acceptance or target criteria, which is in this case related to reduction or minimization of the response time in finding a target within the complex, and then existing the complex upon completion of on-site services by the first responders, as soon as practically possible.

The apparatus configurations include operator assistance. The apparatus can be configured to allow authorized or assigned by the complex operator to maintain up-to-date information of status and availability of all routes within the complex, and store the information on the host controller. The apparatus can be configured to allow authorized operator by the complex to set priorities between first responder teams expected to enter the complex, and real-time adjustments during the time the first responders are within the complex, and informing the first responders of the configuration. The apparatus can be configured to interface and communicate with other systems within and outside the complex, including: existing security system; emergency system including 911; system navigating first responders; system installed into first responder transportation vehicles conveying status information to the first responders in real-time. The network interface for the apparatus within the apparatus, and between apparatus and other controllers, can be configured to support any combination of wired and wireless network topologies, including: RF, cellular.

The apparatus maintains status of the available routes within the complex by:

1) Monitoring sensors of the apparatus installed at the complex, and
2) Processing data entered by an authorized operator directly via user interface, which includes remote devices.

TABLE 6

| Label | Description<br>Illuminated Street Address Signs |
| --- | --- |
| SM | Main Complex Illuminated Street Address Sign |
| SM1 | Main Office Street Address Illuminated Sign |
| S1A | Illuminated Address Sign Unit 1A |
| S2A | Illuminated Address Sign Unit 2A |
| S3A | Illuminated Address Sign Unit 3A |
| S4A | Illuminated Address Sign Unit 4A |
| S5A | Illuminated Address Sign Unit 5A |
| S6A | Illuminated Address Sign Unit 6A |
| S7A | Illuminated Address Sign Unit 7A |
| S8A | Illuminated Address Sign Unit 8A |
| S9A | Illuminated Address Sign Unit 9A |
| S1B | Illuminated Address Sign Unit 1B |
| S2B | Illuminated Address Sign Unit 2B |
| S3B | Illuminated Address Sign Unit 3B |
| S4B | Illuminated Address Sign Unit 4B |
| S5B | Illuminated Address Sign Unit 5B |
| S6B | Illuminated Address Sign Unit 6B |
| S7B | Illuminated Address Sign Unit 7B |
| S8B | Illuminated Address Sign Unit 8B |
| S9B | Illuminated Address Sign Unit 9B |
| S1D | Illuminated Address Sign Unit 1D |
| S1E | Illuminated Address Sign Unit 1E |

As shown, each unit within the complex, including the main office M1, have an apparatus configured as an intelligent street address sign. The complex itself includes a networked operated system of devices, which control devices within the system, including combination of intelligent single color and multi-color illuminated street signs for illuminating street names, street addresses, street direction. For simplicity not all labels are shown. Below is description of labels used for intelligent color illuminated street address signs installed in the complex, as part of the apparatus.

S1A through S9A—intelligent color illuminated street address signs installed respectively for units WA through U9A.

S1B through S9B—intelligent color illuminated street address signs installed respectively for units U1B through U9B.

S1C through S1D—intelligent color illuminated street address signs installed respectively for units U1C through U1D.

SM—intelligent color illuminated street address sign installed for the entire complex at the entry by the entry gate 2.

SM1—intelligent color illuminated street address sign installed for the complex office M1.

The intelligent color illuminated street address sign of the apparatus, including: S1X through S9X, can be configured to include: embedded controller defining the intelligence of the sign; sensors for monitoring parameters including: ambient light, internal temperature, proximity motion.

The embedded controller can be configured with non-volatile memory to store pre-set parameters, and store embedded algorithm defining the intelligence of the sign.

The embedded controller of the intelligent color illuminated street address sign of the apparatus can be configured to include manual controls of the sign parameters via remote control device, including infra-red, allowing an user to control; illumination intensity; color of illumination; illumination effects including blinking, rolling colors at various light intensities; power ON/OFF.

The embedded controller of the intelligent color illuminated street address sign of the apparatus can be further configured to monitor through internal sensors the following parameters: level of ambient light; internal temperature; proximity of an object.

The embedded controller of the intelligent color illuminated street address sign of the apparatus can be configured to execute predefined algorithm stored in the controller non-volatile memory. The control algorithm can be configured to include: user interface, including use of ambient light sensor as an input device; remote interface and controls transmitted by a remote host controller. The controls from remote controller can include controls in respect to the sign: illumination intensity; color of illumination; illumination effects including blinking, rolling colors at various light intensities; power ON/OFF. The controls from remote controller can include requests of status of the embedded controller of the sign, and status of parameters monitored by embedded controller via sensors of the sign. The intelligent color illuminated street address sign of the apparatus can be further configured to operate from a stand-by battery when there is a partial or complete loss of electrical power. The embedded controller of the intelligent color illuminated street address sign will detect operation from a stand-by battery, and execute control algorithm to optimize use of the power remaining in the battery for the maximum utilization of the sign features, including providing visibility in the evening and night hours, and improved visibility during emergency. The host controller can be configured to maintain up-to-date information of the status of each component of the apparatus within the complex. The host controller can be further configured to maintain up-to-date information of the status of the routes within the complex. The host controller can be further configured to include non-volatile memory containing configuration parameters and control algorithm defining the role of the host controller within the apparatus. The control algorithm will include: calculation of the most optimum route within the complex to reach an unit of interest; real-time controls of all devices and signs within the apparatus of the complex with or without assistance from the operator to achieve set criteria stored in the non-volatile memory. The set criteria can include: best utilization of resources within the apparatus, and available resources outside the apparatus, to provide real-time precise and clear navigation of first responders within the apparatus to reach a target location as soon as practically possible.

The apparatus configuration includes operation as a closed loop control system executing controls in real-time based on status of the complex related to the system, provided by sensors and operator, and executing real-time control algorithm to reach the set criteria.

The set criteria can include: real time navigation of a first respondent crew or a number of first responders crews attending to an emergency or emergencies within the complex with an objective to minimize the response time of each first respondent team in a priority order determined by a remote controller based on its set criteria, including the state of emergency.

The apparatus or selected devices of the apparatus can be controlled by mobile devices, including mobile phones, using a dedicated program developed in support of functions available by the apparatus.

TABLE 7

| Label | Description Street Navigation Directional Signs |
|---|---|
| SR1 | Route illuminated directional sign 1 |
| SR2 | Route illuminated directional sign 2 |
| SR3 | Route illuminated directional sign 3 |
| SR4 | Route illuminated directional sign 4 |
| SR5 | Route illuminated directional sign 5 |
| SR6 | Route illuminated directional sign 6 |
| SR7 | Route illuminated directional sign 7 |
| SR8 | Route illuminated directional sign 8 |
| SR9 | Route illuminated directional sign 9 |

Table 7 illustrates street navigation directional signs, as part of the apparatus of the complex.

The street navigation directional signs of the apparatus can be configured as intelligent color illuminated directional signs. These signs are intended to illuminate an image helping to navigate a first responders crew within the complex. The directional sign image can be configured as: an arrow, or a street name, or combination of both, which is when illuminated will be pointing in the direction, or will light up a street name the first responders crew should follow. The directional signs of the apparatus can be further configured to include: embedded controller defining the intelligence of the sign; sensors for monitoring parameters including: ambient light, internal temperature, proximity motion. The embedded controller can be configured with non-volatile memory to store pre-set parameters, and store embedded algorithm defining the intelligence of the sign. The embedded controller of the intelligent color illuminated directional sign of the apparatus can be configured to include manual controls of the sign parameters via remote control device, including infra-red, allowing an user to control: illumination intensity; color of illumination; illumination effects including blinking, rolling colors at various light intensities; power ON/OFF.

The embedded controller of the intelligent color illuminated directional sign of the apparatus can be further configured to monitor through internal sensors the following parameters: level of ambient light; internal temperature; proximity of an object.

The embedded controller of the intelligent color illuminated directional sign of the apparatus can be configured to execute predefined algorithm stored in the controller non-volatile memory. The control algorithm can include: user interface, including use of ambient light sensor as an input device; remote interface and controls transmitted by a remote host controller. The controls from remote controller can include controls in respect to the sign; illumination intensity; color of illumination; illumination effects including blinking, rolling colors at various light intensities; power ON/OFF. The controls from remote controller can include requests of status of the embedded controller of the sign, and status of parameters monitored by embedded controller via sensors of the sign.

The intelligent color illuminated directional sign of the apparatus can be further configured to operate from a stand-by battery when there is a partial or complete loss of electrical power. The embedded controller of the intelligent color illuminated directional sign will detect operation from a stand-by battery, and execute control algorithm to optimize use of the power remaining in the battery for the maximum utilization of the sign features, including providing visibility in the evening and night hours, and improved visibility during emergency.

The host controller can be configured to maintain up-to-date information of the status of each component of the apparatus within the complex. The host controller can be further configured to maintain up-to-date information of the status of the routes within the complex. The host controller can be further configured to include non-volatile memory containing configuration parameters and control algorithm defining the role of the host controller within the apparatus. The control algorithm will include: calculation of the most optimum route within the complex to reach an unit of interest real-time controls of all devices and signs within the apparatus of the complex with or without assistance from the operator to achieve set criteria stored in the non-volatile memory. The set criteria can include: best utilization of resources within the apparatus, and available resources outside the apparatus, to provide real-time precise and clear navigation of first responders within the apparatus to reach a target location as soon as practically possible.

The apparatus directional signs can be configured for being attached to a lighting pole, including illustrated on FIG. 3. Configuration of the directional sign will include pointed illumination of standard reflective street name signs improving their visibility in the evening and night hours.

All components of the apparatus, including apparatus itself, will be in compliance with regulations of respective agencies, and in compliance with the national electric code. Respective components of the apparatus will be rated for outdoor operation, with compliance to respective NEMA and/or IP ratings.

The directional signs can be configured to be powered from the power sources available in the lighting pole, including P1 through P9, as shown on FIG. 3

All devices, including signs, within the apparatus can be configured for a plugin or hard-wired installations.

All devices, including signs, within the apparatus can be configured for a power backup configuration, using such devices as batteries, including solar.

TABLE 8

| Label | Description<br>One Street Navigation Directional Signs |
|---|---|
| SR2L | Route illuminated directional sign 2 Left |
| SR2R | Route illuminated directional sign 2 Right |
| SR3L | Route illuminated directional sign 3 Left |
| SR3R | Route illuminated directional sign 3 Right |
| SR4L | Route illuminated directional sign 4 Left |
| SR4R | Route illuminated directional sign 4 Right |
| SR5L | Route illuminated directional sign 5 Left |

TABLE 8-continued

| Label | Description<br>One Street Navigation Directional Signs |
|---|---|
| SR5R | Route illuminated directional sign 5 Right |
| SR6L | Route illuminated directional sign 6 Left |
| SR6R | Route illuminated directional sign 6 Right |

Table 8 lists the intelligent illuminated street navigation directional signs of the apparatus, which are installed at the intersections of the routes within the complex, and are configured to provide real-time navigation of the direction the first responders should take to reach the target location within the complex as soon as practically possible. The intelligent illuminated street navigation directional signs include: illuminated street name plates; illuminated directional signs with arrow; illuminated special signs, including: "EXIT".

TABLE 9

| Label | Description<br>Other Items |
|---|---|
| 1 | Complex |
| 2 | Main Gate |
| 3 | Host Controller |

Table 9 lists other elements of the complex, labeled 1:
2—Main gate of the complex
3—Apparatus Host Controller of the complex providing real-time controls of devices of the apparatus within the complex.

Configurations of the apparatus and components within apparatus shown on FIG. 3 include configurations of the apparatus and its components described in this application. Remaining elements of FIG. 3 are labeled same as on FIG. 2.

Figure 4:
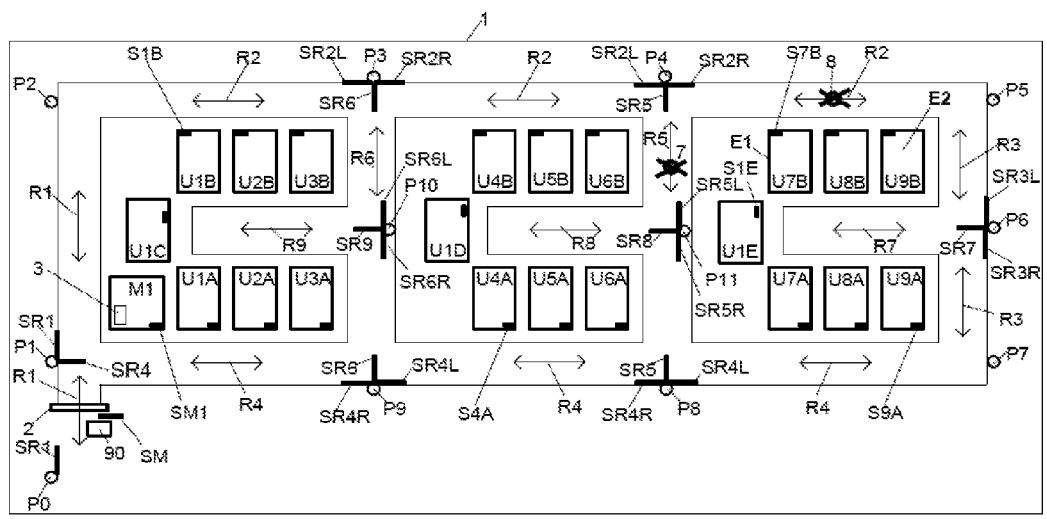

FIG. 4 illustrates a layout of the complex shown on FIG. 3 with the apparatus installed, and condition within the complex as follows:

The unit U7B is experiencing emergency, as indicated by E1.

The unit U9B is experiencing emergency, as indicated by E2.

The route R5 is under repairs at the location indicated by "X" and marked with 7.

The route R2 is under repairs at the location indicated by "X" and marked with 8.

Figure 5:
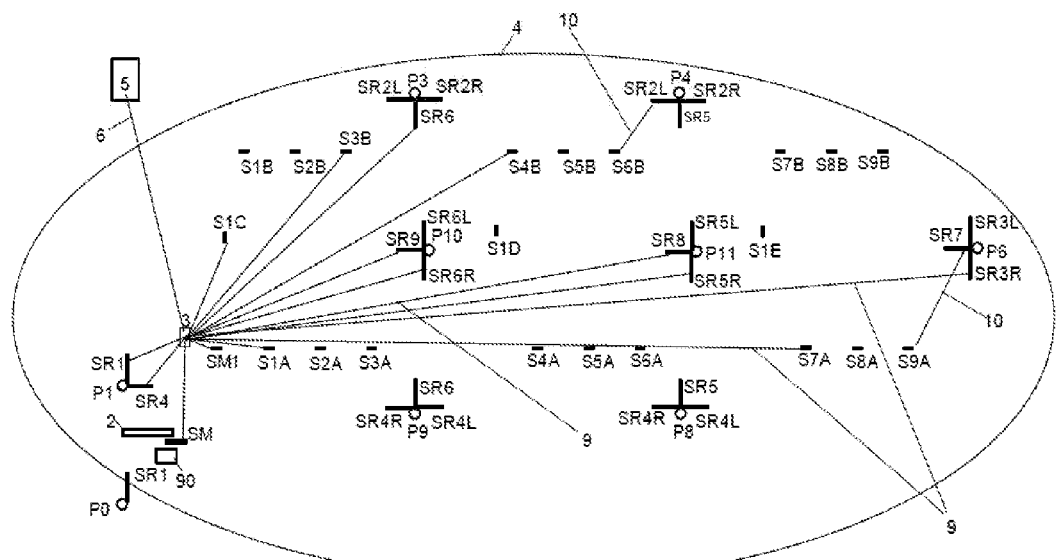

For illustration purposes, let's assume:
a) The emergency E1 at U7B occurred first, followed by emergency E2 at U9B shortly after
b) The 911 service was notified and respective independent first responder crew #1 for E1 and first responder crew #2 for E2 are on their way to the complex In this situation, during the evening and night hours, and during anytime as requested by the complex operator or by a remote controller outside the complex, including the one labeled 5 on the next FIG. 5, the apparatus controller (3) can be configured to execute the emergency algorithm as follows:

1) As soon as the first emergency E1 occurred, the complex main sign will blink at intensity visible from several hundreds of feet away during evening and night hours. In addition the sign 37B of the unit U7B with emergency E1 will blink, and the sign S9B of the unit U9B with emergency E2 will blink, improving their visibility during the evening and night hours to about hundred feet away. The distance is based on ability of the first responders to spot the respective sign within their sight. The illuminated message sign (90) will display status of the community, and the message can include: status of routes within the community and important information for the first responders teams.

2) Based on the latest status of the routes within the complex, which is maintained manually in this example by the maintenance crew of the complex, the Host controller (3) will establish the most optimum ENTRY routes for first responders crew #1 to attend to E1 as soon as possible, and for first responders crew #2 to attend to E2 as soon as possible.

3) According to the complex layout presented on FIG. 4 the first responders crew #1 will be assigned directional signs with WHITE and RED colors, while the first responders' crew #2 will be assigned directional signs with WHITE and GREEN colors, to distinguish directional signs between the two crews. The directional signs with WHITE color are suitable for both crews, while the directional signs with RED color are only for crew #1, and the directional signs with GREEN color are only for crew #2.

Each first responder crew prior to entering the complex will be informed by the apparatus of the color assignments within the complex, and state of the main sign of the complex itself.

4) The most optimum route for crew #1 will consist of: R1 to R2, locating U7B on the right side along R2

5) The most optimum route for crew #2 will consist of: R1 to R4 to R3 to R2, locating U9B on the left side along R2

6) Based on calculations performed by the apparatus and the objective to minimize the response time of each responder crew within the complex, the controller (3) of the apparatus for ENTRY algorithm will setup the following state:

SM—blinking indicating emergency within the complex; intensity selected to make the sign visible as soon as the sign is within the sight of the first responders S7B—blinking indicating emergency state of unit U7B
S9B—blinking indicating emergency state of unit U9B
SR1 on pole P0—turned WHITE, directing both crews to enter the complex main gate (2) taking R1.
SR1 on pole P1—turned ON with RED color, directing the responder crew #1 to continue along R1 upon entry into the complex through the main gate (2) directing the responder crew #1 along R2.
SR2L/SR2R on pole P3, SR2L/SR2R on pole P4—are turned ON with RED color.

As result, the first responder crew #1 upon entry into the complex through the main gate M1, will follow R1 which ends at R2, and proceed on R2 locating the unit U7B on the right side of R2.

SR4 on pole P1—turned ON with GREEN color, directing the responder crew #2 to make a right turn toward R4 upon entry into the complex through the main gate (2). SR4R/SR4L on pole P9, SR4R/SR4L on pole P8, SR3R/SR3L on pole P6—are turned ON with RED color.

As result, the crew #2 will upon entry into the complex through the front gate (2) will make a right turn to R4, and follow R4 which ends at R3, and then proceed on R3 which ends on R2, and then continue on R2 locating the unit U9B on the left side of R2.

NOTE: The intelligent color illuminated directional signs can be configured as illuminated street name signs only (107) as shown on FIG. 7, or as a combo integrated direction/street name signs (108) as shown on FIG. 8, or as a combination of stand-alone (107) and directional stand-alone signs (109) illustrated on (109). Each configuration can be conveniently installed on a near-by lighting pole or a pole for supporting existing street name plates.

7) Similarly, the apparatus controller will calculate the most optimum EXIT route for each first responder crew upon completion of their on-site services. The calculation will be based on the latest status of routes within the complex, and priority assigned to each responder crew. The host controller of the apparatus will control in real-time the directional signs within the complex, similarly as it is described for the ENTRY algorithm, with an objective to guide each crew back through the main gate (2) as soon as practically possible.

It is important to consider that an emergency is not just related to a health condition. It can be related to some property damage, including a broken water pipe or a small fire. In these type of cases, while the first responder crew is on its way to reach the target, and even while attending to the problem on-site, the damage can make significant progress, potentially impacting a route which would be considered in the EXIT algorithm. Sensors of the apparatus can be placed at strategic locations to monitor condition of the routes, and report in real-time their status to the host controller. As result, the EXIT algorithm executed by the host controller of the complex will be based on the latest status of routes within the complex, and will provide the shortest and fastest way out of the complex.

TABLE 10

| Label | Description |
| --- | --- |
| 1 | Complex |
| 2 | Main Gate |
| 3 | Host Controller |
| 4 | Control Network of the Complex via Host Controller |
| 5 | Remote Host Controller |
| 6 | Interface between (3) and (5) |
| 7 | Obstruction on Route 5 |
| 8 | Obstruction on Route 3 |
| 9 | Interface between devices within apparatus |

The Host computer (3) will maintain self-diagnostics status of components of the apparatus, including: intelligent signs; sensors; power supplies; network interfaces; and report apparatus status to a remote controller (5) and an authorized operator of the complex. Configurations of the apparatus and components within apparatus shown on FIG. 4 include configurations of the apparatus and its components described in this application. Remaining elements of FIG. 4 are labeled same as on FIG. 3.

FIG. 5 illustrates an apparatus configuration as a networked system (4), including: controllers, intelligent street illuminated signs. The networks within the system are interconnecting the devices within the apparatus of the complex (1) shown on FIG. 3, and connecting the apparatus to remote controller (5) via network (6). For simplicity, only devices connected to the network are shown, with an exception of lighting poles P0 through P9 considered as mounting locations for the intelligent illuminated street name signs, directional signs and message signs, including the ones labeled SR1 through SR9, and for the main gate (2) which is considered as an entry and exit point to and from the complex. The network configuration can be any combination of wired and/or wireless topology, including INTERNET. The network interface for the devices within the apparatus, including the one labeled (9) interfacing the host controller (3) with the devices within the network (4), and between apparatus and other controllers, including the remote controller (5) interfaced via connection labeled (6), can be configured to support any combination of wired and wireless network topologies described in this application, including: RF, cellular. The control algorithm described for FIG. 4 is executed by the host controller (3) of the apparatus using the network (4). Connections, including (9) are shown from the host controller (3) to each device within the apparatus of the complex, and devices including intelligent signs, can communicate directly sign to sign, as illustrated by (10) interfacing directly (S9A) and (SR7).

Examples include: a broadcast command transmitted by the host (3) can be re-transmitted by a device within the network; emergency state initiated by one sign, including illuminated street address, can be transmitted directly to the illuminated street address sign nearby, as illustrated by connection between address sign (S6B) and street sign (SR2L).

The apparatus can be configured to include other devices; video sensors or cameras for surveillance of status of the routes within the complex; audio sensors to detect presence of audio signals at designated locations; strain gauge sensors for detecting presence of a weight at monitored locations. Each sensor can be configured and have preset condition stored in non-volatile memory of the controller (3). Controls of the controller (3) are stored in the non-volatile memory. When a preset condition of a sensor is reached, the controller will execute control algorithm assigned to the condition. The devices within apparatus, including intelligent illuminated signs, sensors, can report change of their status directly to the host, or respond with the, status per request from the host. Example includes: emergency condition E1 reporting by a customer of a unit (U7B) can include the customer using local IR remote controller changing the state of the intelligent illuminated residential address sign (S7B) attached to the customer unit; the sign (S7B) M1 report the change of its status from normal to emergency to the host computer (3); host computer (3) will execute emergency control algorithm in respect to the emergency E1. The status of each intelligent residential street address sign can include type of emergency, including: health; water damage; fire. The intelligent illuminated street message sign (90) configurations include displaying status of the community, including warning and attention type messages in respect to maintaining safety with the community. Configurations of the apparatus and components within apparatus shown on FIG. 5 include configurations of the apparatus and its components described in this application. Remaining elements of FIG. 5 are labeled same as on FIG. 3 and FIG. 4.

Figure 6:
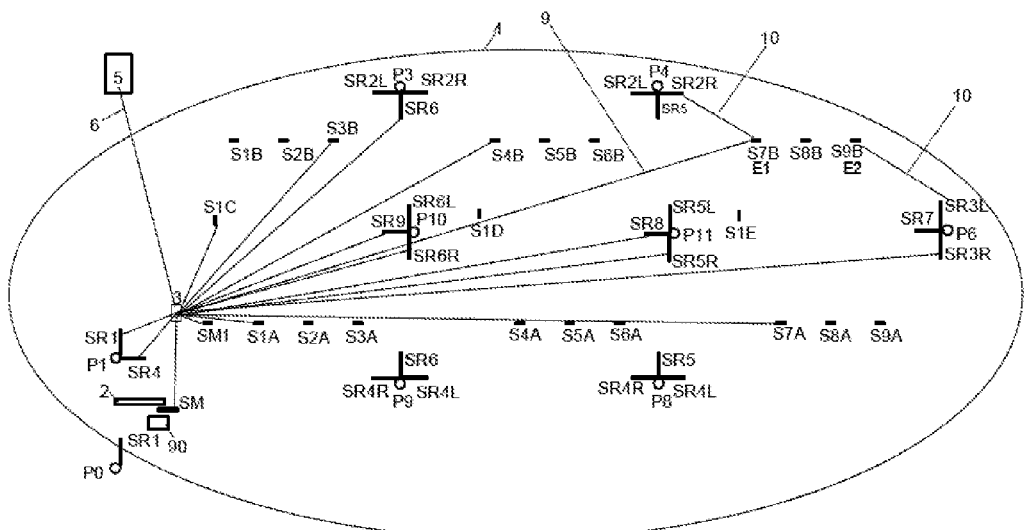

FIG. 6 illustrates the apparatus configured as a networked system shown on FIG. 5 with emergency status labeled E1 experienced by the unit with intelligent illuminated street address sign S7B, and emergency status labeled E2 experienced by the unit with intelligent illuminated street address sign S9B, corresponding to condition illustrated on FIG. 4. As shown, customer of unit (U7B) via customer interface can report emergency condition E1 by changing state of (R7B) from normal to emergency. The customer interface to the signs include configurations described in this applications.

The sign (S7B) will report the change of its status from normal to emergency to the host computer (3) via network connection (9), and also report the change in status to emergency to the nearby illuminated street sign (SR2R) via network connection (10). The Host computer (3) will execute emergency control algorithm in respect to the emergency E1. The intelligent illuminated street address sign (SR2R) will change its status from normal to emergency, pointing in the direction of (U7B). The status of each intelligent residential street address sign can include type of emergency, including: health; water damage; fire. The type of emergency can be specified by the customer using either special buttons on the remote controller keypad, or selecting specific illumination effect on the sign (S7B), or combination of both. Configurations of the apparatus and components within apparatus shown on FIG. 6 include configurations of the apparatus and its components described in this application. The intelligent illuminated street message sign (90) configurations include configuration displaying status of the community, including warning and attention type messages in respect to emergency conditions E1 and E2. Remaining elements of FIG. 6 labeled same as on FIG. 5 and FIG. 4.

Figure 7:
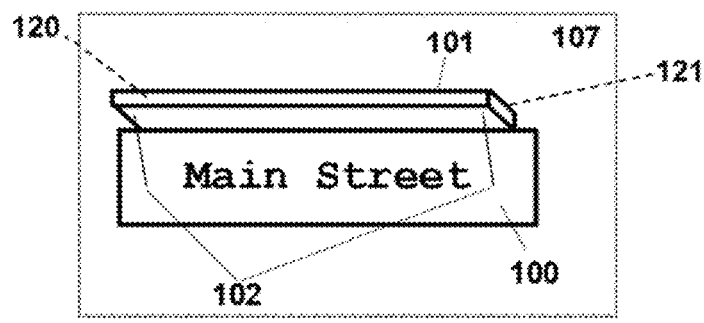

FIG. 7 illustrates apparatus configuration as illuminated name plate (107), including street address name, consisting of the name plate including street address (100) shown as "Main Street" as an example, and an intelligent illumination component (101) of the apparatus. The intelligent illumination component (101) is designed to provide illumination of the name on (100) as indicated by the light direction (102), improving its visibility in particular during evening and night hours.

The intelligent illumination component (101) can be configured to include controls of: light intensity; light color; special illumination effects, including: blinking, color change or rolling, to signify the status of the entity identified by the name plate (100), including status of a street name.

The illumination component (101) can be configured to include a controller and solid state illumination devices. Solid-state illumination devices can include LED's, solid state illumination devices with single, multiple colors, including RGB LED's, and combination of both. Solid-state illumination devices can be installed and connected to controller on: PCB's, individual wiring harnesses, flex circuit strips, and any combination of. Controller of (100) can have wired or wireless interface, including INTERNET, to remote controller, such as host controller (3) of the complex (1), shown on FIG. 3. The illuminated name plate (107) can be included into the apparatus, and applied for identification of all or selected routes within the complex (1), including the ones identified by SR1 through SR9, shown on FIG. 3. The packaging or construction of (101) can be configured to shine the light toward the name plate and the area underneath the name plate. The upper perimeter sides (120, 121) of the (101), can be internally illuminated with the same or different color to further signify the status of the section of the complex identified by the illuminated name plate (107). As illustrated on FIG. 3 and FIG. 4 the (107) can be used for illuminating street name plates SR1 through SR9. The (101) illuminating the street name with WHITE color are for general use. The (101) illuminating the street name with RED, GREEN, BLUE or other color, can be configured for special use, as part of the apparatus real-time navigation system within the complex pointing to the street name and direction to be used. The color of the perimeter lighting (120, 121) can be different from the main color illuminating the name plate, and the illumination of each section of the (101) can be controlled by the apparatus remote controller (3) to improve the sign visibility, and signify the status of the street name, listed on the name plate.

The (107) can include sensors monitoring such parameters: internal temperature of the sign itself; ambient light; proximity of an object. Control algorithm of (101) can include all control or selected features listed for street address signs (S1X) through (S9X) described under FIG. 3.

The Illumination devices, including LED's, can be controlled individually, or in groups. The controls of the apparatus will include self-diagnostics algorithm, which based on sensors will periodically perform verification of status of each component within apparatus, and apply controls to each component within the apparatus within requirements or limitations listed by the specifications for components, including solid-state illumination devices, maintaining operation of all devices within their specifications, including environment specifications, at all times. The apparatus will inform operator if any of the parameters or status of a device is outside of the specifications. When this condition is detected, apparatus automatically, without operator assistance in real-time will adjust controls to avoid failure.

The entire apparatus can be configured to include battery backed power. When there is a partial or complete power outage within the complex (1), the apparatus will automatically switch to the stand-by back-up power, and continue operation.

During operation from the stand-by back-up power, the apparatus will apply control algorithm to optimize illumination parameters of all illumination signs within the complex (1) in order to extend the operation to maximize use of power available from the stand-by back-up power.

The stand-by power can include combination of: stand-by power for the entire complex (1) and a stand-by battery backup for each individual intelligent illuminated sign within the complex. The local controls of each individual intelligent illuminated sign within the complex when operated under battery backup will execute controls of the respective sign to optimize power for illumination purposes while extending use of the power available from the battery.

The priority of the back-up power use can be set by the remote host, including (5) or by local authorized operator of the complex. At the time of emergency the main priority can be allocated to providing precise and clear navigation to the first responders within the complex, assisting first responders to execute the ENTRY and EXIT procedures attending to an emergency within the complex as soon as practically possible, reducing their response time in their line of duty as much as possible.

At an intersection where a street, which is selected for a navigational route, starts, the controller can illuminate via (101) the street name plate (100) with a selected color, and add other illumination effects including: rolling colors, or blinking, as an indication that the respective turn to the street should be made at the intersection.

In this configuration, the attention to the beginning of the street, including "Main Street" in the example on FIG. 7, which should be taken as the part of the navigational routing, is indicated by illuminating the name plate (100) by the intelligent illumination device (101), and controlling the device (101) illumination parameters either selected color, special effects, or combination of both. Configurations of the apparatus and components within apparatus shown on FIG. 7 include configurations of the apparatus and its components described in this application.

Figure 8:
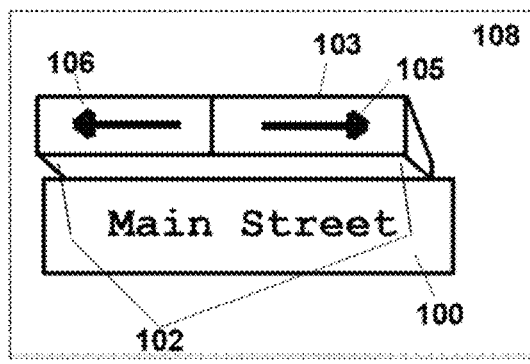

FIG. 8 illustrates apparatus configuration as illuminated name plate (108), including street address name, consisting of the name plate including street address (100) shown as "Main Streets" as an example, and an integrated intelligent illumination component (103) of the apparatus. The intelligent illumination component (103) is designed to provide illumination of the name "Main Street" on (100) as indicated by the light direction (102), improving the name visibility in particular during evening and night hours. The intelligent illumination component (103) is further configured to include illuminated directional signs (105) and (106). Each illumination section of the (103), including (105), (108), and the section illuminating the name, can be controlled independently of each other, and include controls of, light intensity with power ON/OFF; special illumination effects, including: blinking, color change or rolling, to signify the status of the entity identified by the name plate (100), including status of a street name. As shown, the specific configuration of the directional signs (105, Left Arrow) and (106, Right Arrow) are for the street name installed at a T-intersection, or at a cross intersection, where both turns are available. Under controls from the host controller (3) of the complex, if the sign is selected by the host controller as part of the navigational route within the complex, then respective either (105) or (106) will be lighted up to provide required direction at the intersection. The controls include: intensity, color, special effects. The street names not included by the host (3) into the selected navigational routes, will have only illumination control of the sign name itself, and the color and intensity of illumination will be adjusted to provide their general visibility within the complex. In this configuration, the attention to the beginning of the street including "Main Street" in the example on FIG. 8, which should be taken, as the part of the navigational routing, is indicated by intelligent illuminating directional sign (103), indicating direction by illuminating the directional sign either (105) for the right turn, or (106) for the left turn. Configurations of the apparatus and components within apparatus shown on FIG. 8 include configurations of the apparatus and its components described in this application.

Figure 9:
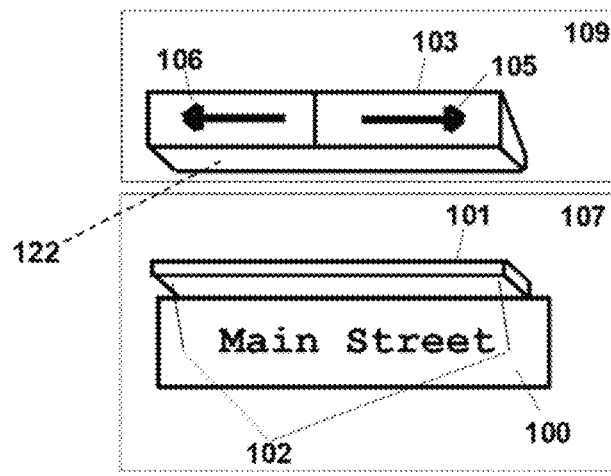

FIG. 9 illustrates configuration of apparatus as illuminated name plate (107), including street address name, consisting of the name plate including street address (100) shown as "Main Street" as an example. The apparatus intelligent illumination directional sign (109) is mounted separately from (107). Both (107) and (109) can be mounted from the same pole, including P0 through P9 listed for the complex (1). The illumination section (122) of the (109) can be configured to provide illumination of the area underneath the sign (109), and the controls can include: light intensity with ON/OFF; color. The intelligent illumination directional sign including (109), depending on its location and type of intersection, can be configured with only one directional arrow available. Configurations of the apparatus and components within apparatus shown on FIG. 9 include configurations of the apparatus and its components described in this application.

FIG. 10 illustrates details of an apparatus (200) configured as an intelligent illuminated street and directional sign, which is further configured to include a single enclosure. The enclosure (201) is configured with a section for housing the illuminated street name (202) and a section for housing the illuminated directional signs, shown as "left arrow" (203) and "right arrow (204)". The illumination solid state devices include LED's, which provide parallel view illumination. In the example, the LED strip (205) is generating illumination along the direction (210) providing illumination of the "left arrow" (203), the LED strip (206) is generating illumination along the direction (210) providing illumination of the "right arrow" (204), and the LED strip (207) is generating illumination along the direction (209) providing illumination of the street name (202), labeled "Main Street" in this example. Each LED can be configured and controlled independently, and the configurations for each LED include: number and type of LED's; single color or RGB; rated power; illumination intensity; operating environment; supported control functions, including special effects of blinking. The configuration of the enclosure of the apparatus (200) includes configuration where the bottom section of the enclosure (201) can be transparent, allowing the light generated by LED's (207) in the direction (209) to pass through the (201) and provide general illumination of the area underneath the sign (200). The configuration of the enclosure of the apparatus (200) includes configuration where the light generated by (205) is retained within the area of the "left arrow" (203), and respectfully, the light generated by (206) is retained within the area of the "right arrow" (204). The enclosure (201) of the sign (200) can be configured to include a stand-by battery pack, including a solar battery. The solar battery can be installed on top of (201). Configurations of the apparatus and components within apparatus shown on FIG. 10 include configurations of the apparatus and its components described in this application.

FIG. 11 illustrates details of the side view of the apparatus (200) shown on FIG. 10. Elements are labeled same as on FIG. 10.

FIG. 12 illustrates details of an apparatus (220) configured as an intelligent illuminated street and directional sign, which is further configured to include a single enclosure for directional signs only, and to house solid state illumination devices for illuminating the street name "Main Street" (202). The enclosure configured with a section for housing the illuminated directional signs, shown as "left arrow" (203) and "right arrow (204)". The illumination solid state devices include LED's, which provide parallel view illumination. In the example, the LED strip (205) is generating illumination along the direction (210) providing illumination of the "left arrow" (203), the LED strip (206) is generating illumination along the direction (210) providing illumination of the "right arrow" (204), and the LED strip (207) is generating illumination along the direction (209) providing illumination of the street name panel (202), labeled "Main Street" in this example. Each LED can be configured and controlled independently, and the configurations for each LED include: number and type of LED's; single color or RGB; rated power; illumination intensity; operation environment; supported control functions, including special effects of blinking. The configuration of the enclosure of the apparatus (202) allows the light generated by LED's (207) in the direction (209) to provide general illumination of the area underneath the sign (200). The configuration of the enclosure of the apparatus (202) includes configuration where the light generated by (205) is retained within the area of the "left arrow" (203), and respectfully, the light generated by (206) is retained within the area of the "right arrow" (204). Configurations of the apparatus and components within apparatus shown on FIG. 12 include configurations of the apparatus and its components described in this application.

FIG. 13 illustrates details of the side view of the apparatus (202) shown on FIG. 12. Elements are labeled same as on FIG. 12.

Figure 14:
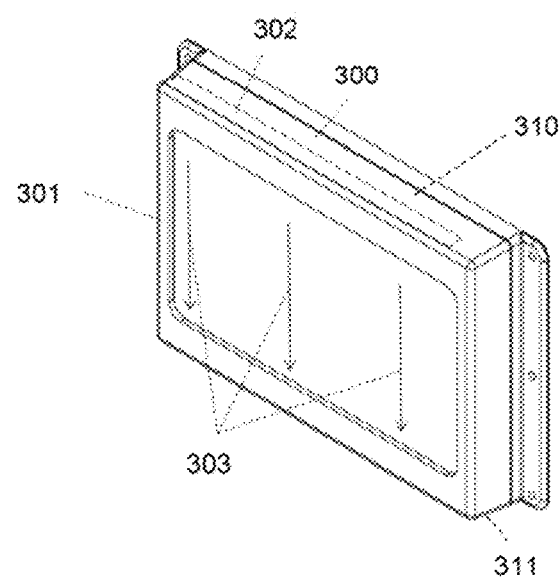

FIG. 14 illustrates 3D view example of an apparatus (300) configured for illuminating street address with illumination devices backlighting from top of the sign toward bottom of the sign, as indicated by direction (303). Similar configuration of the apparatus can be used for illuminating street names. The illuminated components, such as: alpha characters; numeric characters; art; and combination of any of the above can be attached to the illuminated panel (301): front side; back side; or combination of both. The illuminated components, such as: alpha characters; numeric characters; art; and combination of any of the above can also be printed or silk-screened on a transparency, which is then placed in-front of the illuminated panel (301) front side. The apparatus components, including: controller; illumination devices (302); sensors; interfaces—are installed within the enclosure of the apparatus, and outside enclosure: wireless antenna as example. The enclosure of the apparatus can be designed and sealed to meet outdoor requirements, including compliance to ratings defined by NEMA and IP Example of environmental rating: NEMA 4, IP66. The apparatus is designed to meet local and national agency requirements and regulations. Example: compliance to UL, NEC, local ordinances. The location of the components within the enclosure of the apparatus is selected to achieve: reliable operation; uniformed illumination of the illuminated panel from the illuminated device in the direction of illumination. Illuminated devices include LED's mounted along: standard PCB; flexible PCB; individually as discrete parts hardwired; and any combination of above. For the apparatus shown on FIG. 14 the illumination devices (302) are mounted along the interior top side of the enclosure, directing their illumination down toward the bottom side of the enclosure, as indicated by (303), with majority of the illumination flowing parallel to the back side of the illumination panel (301). The illuminating devices (302) can be configured as LED's installed on a flexible PCB with self-adhesive backing to allow the PCB to be attached along the inner surface of the enclosure, as shown by (302). Illuminating devices, including solid state devices, include LED's. LED's can be: color RGB; single color; and combination of both. Controller of the apparatus will provide controlled power to LED devices, and control the illumination parameters, including: light intensity; light flowing; color flowing when color LED's are used; light blinking at various frequencies. Controller will monitor sensors of the apparatus, including: ambient light; proximity; temperature; voltage; current. Controller will support functionality of sensor interfaces, including: wireless LAN, mobile, INTERNET; infra-red from operator remote; audio/voice to/from operator. The default configuration of the sensors of the apparatus will depend on application, and include: trigger points for self-diagnostics in respect to: ambient light; internal temperature; proximity, and associated controls for each trigger point. The default configuration of the controls of the apparatus will depend on application, and include: control algorithm during: normal operating environment, special events as indicated by the operator or remote controller; special conditions as indicated by status of the sensors of the apparatus. The default configuration of the controls of the apparatus will depend on application, and include: control algorithm for illuminating devices during: normal operating environment: special events as indicated by the operator or remote controller; special conditions as indicated by status of sensors.

Configuration of controls of illuminating devices will include: minimum/maximum levels of illumination intensity; tables or functions of light intensity per sensor status. Configuration settings of the apparatus will be designed to comply with regulations and local ordinances, including: minimum/maximum illumination during normal operating conditions; minimum/maximum illumination during special operating conditions; maximum allowable power consumption limit; limits of color selections when color LED's are used. Configurations setting are stored: in controller non-volatile memory; non-volatile memory of a remote controller; or combination of both. The access to apparatus after installation, including changes to default configuration and real-time controls, such as: controls by operator; controls by remote controller—are designed with compliance to applicable regulations of local and national regulations. From this point forward, for simplicity, all references to configuration and controls are assumed to be in full compliance to applicable local and national regulations. The apparatus is an intelligent device, including self-diagnostics continuously running in the background, monitoring status of sensors and status of components of the apparatus to maximize longevity of the apparatus and sustain apparatus operations under various ambient environments as listed in product specifications. The default configurations, or selected portion of the default configuration, can be updated as needed, including after installation is complete. The update of the configuration of the apparatus can be accomplished by the operator using: remote controller, such as infra-red control pad; interface to ambient light sensor; interface to proximity sensor; voice commands. The update of the configuration of the apparatus can be accomplished by the remote controller, such as: remote host; mobile phone using wireless network, including INTERNET. The apparatus will acknowledge the status of the apparatus using: illuminating devices; dedicated status LED's; audio interface; wireless communications; and any combination of above. The status of the apparatus during configuration process by the operator includes: navigation of the operator of the next step during a configuration sequence; acknowledgement of a command executed. The status of the apparatus during configuration process by a remote controller includes: executing specific protocol exchange with the remote controller. The status of the apparatus during normal operating conditions includes: operation of the illumination devices according to configuration algorithm. The apparatus is an intelligent device. Part of the configuration can include time based activities, based on real-time clock of the apparatus controller or based on real-time clock provided by a remote controller. Controller of the apparatus will monitor applied voltage, and will detect a change when connected power sources switched from a regulated power supply to a battery, including conventional battery packs, or solar battery. When detected, the controller will execute algorithm to sustain operation as long as possible, while maintaining minimum applicable requirements. Example, the apparatus may exceed efficiency levels required by local ordinances, and can be operated at higher illumination while consuming less power. When a switch-over to a battery is detected, the controller can switch algorithm to lower intensity to required minimum, and as result, extend or maximize use of power stored in the battery. In time, as needed, when requirements of local ordinances change, the apparatus configuration can accordingly be updated remotely via wireless interface to remote controller. As result, from the moment of the original installation, the apparatus is maintained within local regulations at all times.

The controller of the apparatus can be configured to operate with a predefined margin from maximum allowable specifications on selected components, including illumination devices. Example, illumination device such as LED's, can have rating of 40 mA maximum at maximum rated ambient temperature. The controller of the apparatus can be configured to operate the LED's 20% below maximum ratings, as a safety margin. The manufacturers of LED's list longevity of the devices at 50,000 hours minimum. Control algorithm can be configured for providing 20% safety margin in operating devices in respect to their specification limits, and the fact that during day-time LED's will be turned OFF, the apparatus for applications as illuminated street address sign or street name sign can last over 10 years without maintenance. This is why ability to update configuration to meet latest local ordinances is an important feature to sustain the apparatus in compliance throughout its entire life time, projected at over 10 years of use.

Sensors of the apparatus are located within the enclosure of the apparatus to allow these devices to operate within their specifications requirements. Wireless antenna, and other components, can be mounted externally to the enclosure of the apparatus. Apparatus using wireless interface can be interfaced with: other apparatuses; host controllers; other systems, including security; forming a network of intelligent devices operation of which can be coordinated by a global algorithm to provide required level of safety and security of a community by properly illuminating street address signs, street name signs and other signs based on apparatus, within the community. For apparatus configured without operator remote, the apparatus configuration can be accomplished by the operator using the ambient or proximity sensor.

Example of a procedure allowing the operator using the ambient light sensor requesting configuration change of an apparatus:

1) Ambient light must be present at a level when the sign is OFF
2) Using an object to cover the light sensitivity window of the light sensor, prevent the light from reaching the sensor for at least 5 seconds
3) The apparatus via Illumination devices will acknowledge the condition and will blink 3 times at a rate of about once per second (1 Hz), and then keep illumination ON
4) Following the procedure described in the manual, select the configuration parameters for adjustment.
   Example: 3 taps or triggers of closing/opening the sensor window at about once per second open/close will select the configuration parameter related to maximum illumination intensity. The apparatus will acknowledge the selection by blinking illumination devices prevent 3 times at a rate of about once per second (1 Hz), and then turn OFF the illumination
5) Operator can then with each tap on the sensor window increase illumination intensity one level per each trigger. The illumination devices will turn ON and controller of the apparatus will adjust the intensity one level per each trigger.
6) After no taps or triggers for at least 5 seconds, the controller will set the illumination intensity at the last selected level, and exit the configuration mode by blinking the lights one time and then staying ON at selected maximum intensity.

Similar procedure can be applied to proximity sensor.

Blocking the ambient light sensor with an object during presence of ambient light, as described in the instructions manual, reduces the sensor light reporting level to its lowest trigger point, equal to condition where is no ambient light. Removing the light blocking object will return the sensor light reporting level to represent presence of ambient light. This drastic change of light condition, in practical terms, can only happen when a light blocking object is present and then removed during daytime ambient light.

The sequence of locking the ambient light sensor with an object during presence of ambient light for continuous period of time, example 10 seconds, and then removing the object allowing ambient light to reach the sensor, followed with no further blocking of the light for a specified period of time, example 10 seconds, can be selected to reset the configuration of the apparatus to its default factory setting.

Control algorithm of the apparatus is based on:
1) Trigger points of sensors
2) Controls received from operator remote, when available
3) Controls received from remote controller over wireless interface
4) Controller self-diagnostics
5) Preset time-based controls
6) Combination of any of the conditions described above Control algorithm of the apparatus includes automatic controls of illumination parameters based on:
1) Status of a sensor
2) Trigger point of a sensor
3) Operator command
4) Remote controller command
5) Preset time-based controls
6) Any combination of above Illumination parameters available for control include:
1) Light intensity, including ON and OFF state
2) Light color selection, sequencing
3) Light blinking
4) Combination of any of the above The objective of control algorithm includes:
1) Compliance to regulations, including local ordinances, Example: limit on maximum power consumption; limit on maximum power consumption per set period of time (24 hours, as example); limits on minimum and maximum illumination intensity; turning ON and OFF based on status of ambient light; turning ON and OFF based on time of the day; operation during power outage, including sustaining battery operation; battery regulations, including solar.
2) Sustaining operation of the apparatus within apparatus specification parameters Sensor status includes:
1) Operational
2) Failed Sensor trigger points for ambient light sensor include various levels of ambient light, primarily: day light; evening light; night light; no light (sensor blocked).

Sensor trigger points for proximity sensor include various levels of object being detected: detected close range; detected middle range; detected long range; not detected.

Sensor trigger points for temperature sensor include various levels of temperatures: below low; low; normal; high; very high.

The control algorithm as function of temperature trigger points includes:
1) When "below low"—keep illumination ON at maximum intensity ("warm up" cycle) for specified period of period of time (60 seconds as example), and if still "below low"—turn OFF illumination. Repeat the "warm-up" process few minutes later.
2) When illumination is required and "very high" is detected—turn OFF illumination ("cool-down" cycle) for specified period of period of time (60 seconds as example), and if still "very high"—turn OFF illumination. Repeat the test and "cool-down" process few minutes later.
3) When illumination is required and "high" is detected—reduce illumination to minimum level ("low-down" cycle) for specified period of period of time (30 seconds as example), and if still "high"—repeat the test and "low-down" process few minutes later.
4) When illumination is not required and "high" is detected—execute emergency state illumination (blinking, colors if available) for specified period of period of time (30 seconds as example), and if still "high"—continue as long as below "very high" trigger point.

Control algorithm includes apparatus providing status updates to remote controller, and informing operator via illumination devices, and other user interfaces available. When RGB LED's are used, control algorithm will take into account voltage drops across each color LED, which can be different for each color. To conserve energy, the control algorithm can lower the power applied to LED's, and as result, use only color LED's with minimum voltage drop across maintaining maximum light while conserving energy. Control algorithm will include blinking lights (PWM controls, as example) at frequency not detectable by a human eye, which will also allow to lower consumption of energy by apparatus. Control algorithm includes turning ON illumination devices, including LED's, when the ambient temperature falls below predefined level, and using illumination devices for generating self-heating of the interior area of the apparatus, extending operation of the apparatus at low temperatures. The control algorithm ensures the apparatus is operating within the apparatus specification parameters at all times. The acceptable operating criteria for the apparatus and the control algorithm to achieve the acceptable operating criteria are stored in the non-volatile memory of the apparatus. The designated sections of the enclosure of the apparatus can be configured to let the light generated by the illumination devices to also illuminate the area surrounding the apparatus. For example, for the apparatus shown on FIG. 14, the direction of the light (303) generated by LED's (302) is toward the bottom side of the apparatus. To maximize the use of the light generated by LED's (302), the bottom section of the enclosure (311) of the apparatus can be configured to let the light penetrate through its surface and illuminate the area underneath the apparatus, providing general illumination of the area, further contributing in improving environmental safety. The apparatus is configurable in compliance to local and national regulations for applications as intelligent illuminated: street address sign, street name sign; street message sign, building sign, traffic sign. The apparatus enclosure section (310) can be configured for installation of a solar battery. Configurations of the apparatus and components within apparatus shown on FIG. 14 include configurations of the apparatus and its components described in this application.

Figure 15:
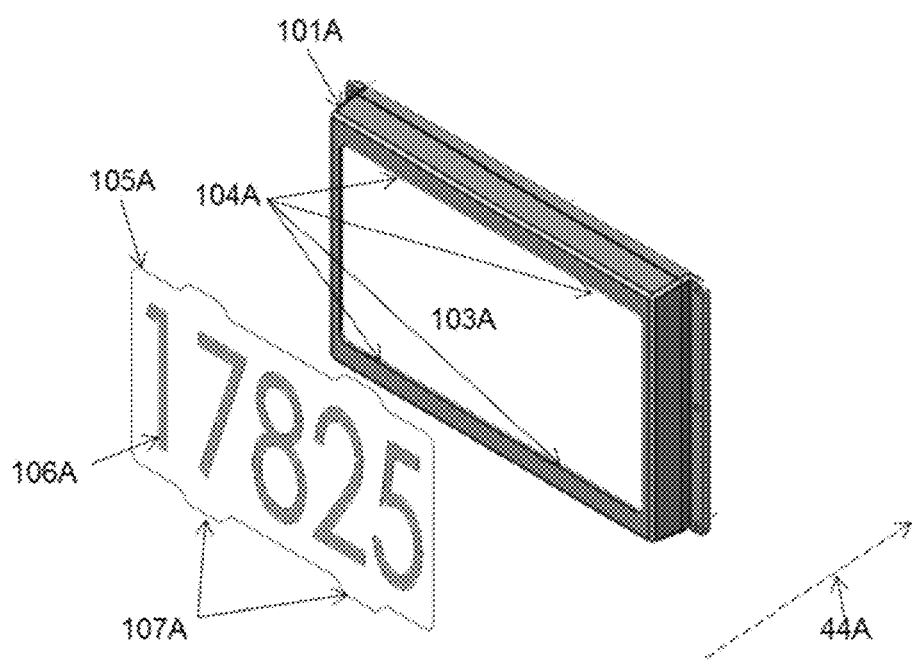

FIG. 15 illustrates an example of a 3D assembly drawing of an apparatus configured for illuminated sign. The drawing illustrates the major components of the Sign being assembled in the direction (44A). The illumination of the front Illuminated Panel (103A) of the Sign is provided by LED's installed inside the Enclosure (101A) of the Sign, and more specifically along the perimeter of selected sides of the Enclosure (101A), shining their light in-parallel to the inner surface of the Illuminated Panel (103A), or under a slight angle toward the inner surface of the Illuminated Panel (103A). The Sign is further configured with Pockets (104A), four shown as example, which are configured to accept respective Tabs (107A) from a Sign Sheet (105A) to allow placement of the Sign Sheet (105A) on the top of the Illuminated Panel (103A) and securing the Sheet (105A) position in place in respect to Panel (103A). The Sign Sheet (105A) is shown with numbers '17825' (106A), which can be attached or embedded to the Sign Sheet (105A) by means of: adhesive, printing, writing by hand. The Pockets (104A) can be configured to retain the Sign (105A) during ambient environment listed in the sign specifications. For outdoor installations, and as needed, the Symbols (106A) can be printed on the back side of the Sign Sheet (105A), and the front surface of the Sign Sheet (105A) protecting the Symbols (106A0 from direct contact with the ambient environment. The numbers (105A) are example, and can be configured to represent a street address number, Additional Symbols, such as combination of characters, art can be added or embedded to the Sign Sheet (105A). The process of placing Symbol (106A) onto the Sign Sheet (105A) includes: printing, silk-screening, painting Configurations of the apparatus and components within apparatus shown on FIG. 16 include configurations of the apparatus and its components described in this application.

Figure 16:
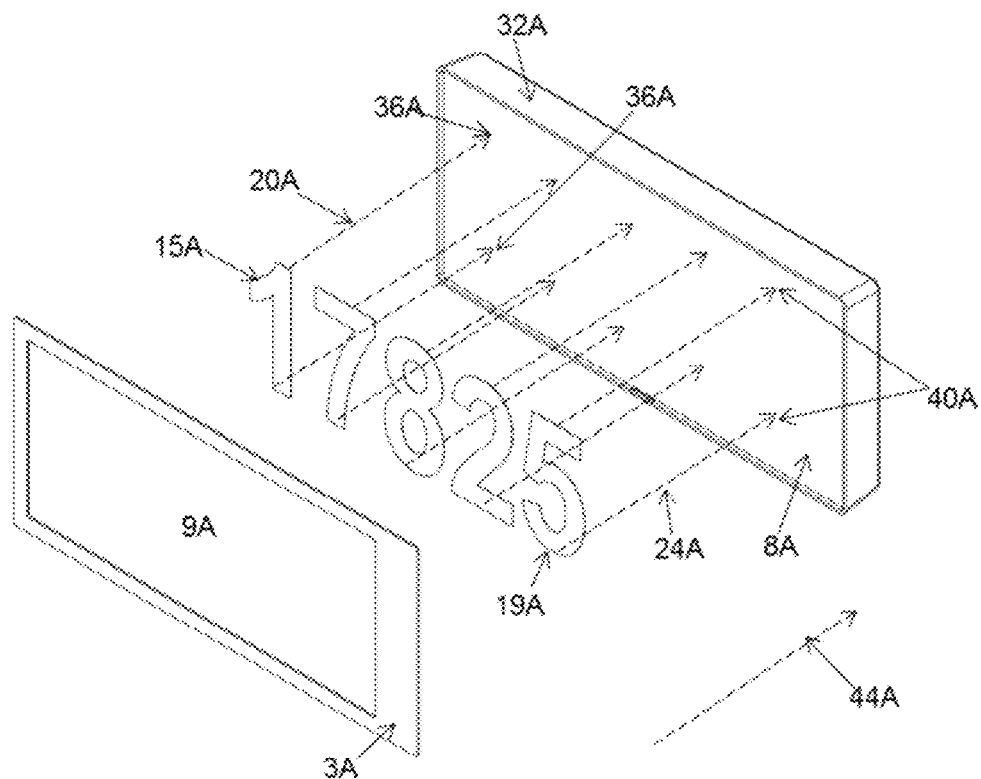

FIG. 16 illustrates an example of a 3D assembly drawing of an apparatus configured for illuminated sign with permanently attached numbers. The drawing illustrates the major components of the Sign being assembled in the direction (44A). The illumination of the front Illuminated Panel (8A) of the Sign is provided by LED's installed inside the Enclosure (33A) of the Sign, and more specifically along the perimeter of selected sides of the Enclosure (33A), shining their light in-parallel to the inner surface of the Illuminated Panel (8A), or under a slight angle toward the inner surface of the illuminated Panel (8A). The Sign is configured to allow gluing of Symbols to the illuminated Panel (8A). As shown for example, five numbers: '1' labeled as (15A), '7' labeled (16A), '8' labeled as (17A), '2' labeled as (18A) and '5' labeled as (19A) with each number being configured with self-adhesive backing can be attached directly to Panel (8A). For simplicity, not all labels are shown. (24A) is indicating the direction of each number (15A) through (19A) to be adhered to respective locations on the Panel (8A). Adhesive materials are configured to specification requirements, including ambient. Configurations of the apparatus and components within apparatus shown on FIG. 16 include configurations of the apparatus and its components described in this application.

Figure 17:
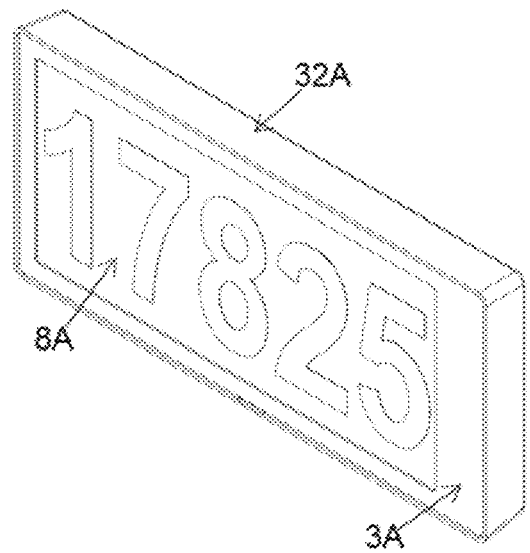

FIG. 17 illustrates a 3D assembled of an apparatus configured for illuminated sign illustrated on FIG. 16. Components are labeled same as on FIG. 16.

Figure 18:
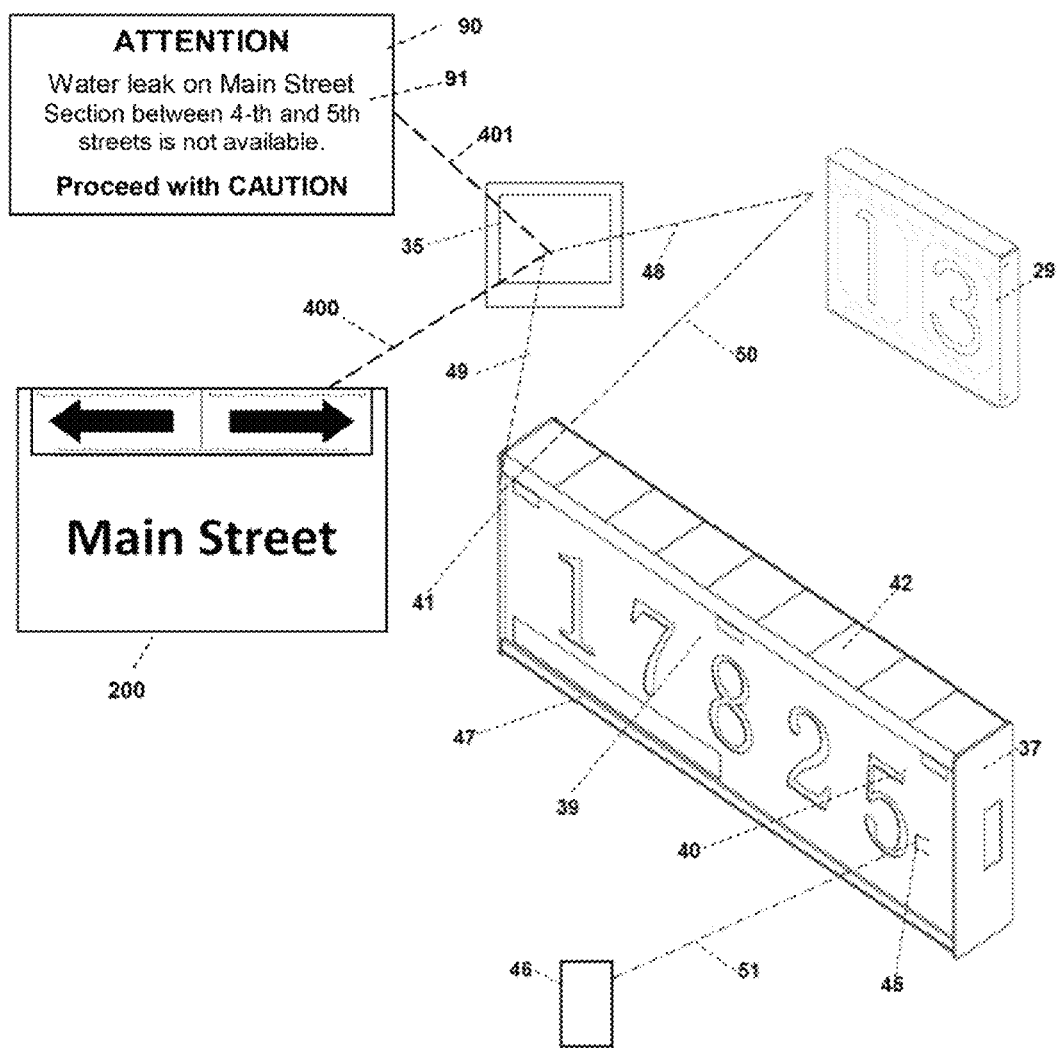

FIG. 18 illustrates an example of a diagram of an intelligent configurable apparatus, which is configured as a system improving safety within a community and assisting in reduction of the response time of first responders attending to an emergency within the community. For simplicity not all components of the system are shown. The configuration of the intelligent modular configurable apparatus include configuration, which in this example includes: at least one configurable intelligent illumination module (29, 37, 90, 200): at least one configurable solid-state light source; at least one configurable display; at least one configurable sensor; at least one configurable power source; at least one configurable module controller; at least one configurable host controller (35): at least one configurable network (48, 49, 50, 401): at least one configurable acceptance criteria. The configuration of the system in the example can vary depending on application, and depending on application the configuration can include:

1) Programming the least one configurable intelligent illumination module; said programming including configuration and control algorithm; said configuration including acceptance criteria; said control algorithm including control of the module sustaining operation of the module within the acceptance criteria; said programming including operator; said programming including programming of a at least one device within the apparatus, and programming of at least one system within the apparatus; said system comprising system devices, including a system controller; said programming including system configuration and control algorithm; said system configuration including system acceptance criteria; said system control algorithm including sustaining operation of the system within the acceptance criteria; said programming including operator; said control algorithm including configuration of an interface between the system controller and the at least one intelligent illumination module; said interface including wireless network for mobile devices, LAN and INTERNET;
2) Configuring the at least one intelligent illumination module for illuminating a configurable street sign; said sign configuration including street name sign, street address sign;
3) Configuring the at least one power source to provide power to the at least one intelligent illumination module during a power outage;
4) Configuring the at least one module controller for monitoring status of ambient environment; said controller monitoring status of the module, including self-diagnostics of electronics within the module; said controller executing controls, including the controls of the at least one solid state illumination source of the module,
5) Configuring the system for providing real-time visual navigation within a community: said navigation including configuration of the devices within the system; said devices including the at least one intelligent illumination module; said intelligent illumination module is a configurable street sign; said sign configuration including street name sign, street address sign, street directional sign; street message sign; said configuration including:
   a) Identifying within the community location of street name signs which are not clearly visible during evening and night hours, and installing the intelligent illumination modules configured for illuminating street name signs;
   b) Identifying within the community location of street address signs which are not clearly visible during evening and night hours, and installing the intelligent illumination modules configured for illuminating street address signs;
   c) Identifying within the community location of street intersections which are not clearly visible during evening and night hours, and installing the intelligent illumination modules configured for illuminating street name signs, and the street name signs including illuminated directional signs;
   d) Identifying within the community location and installing the intelligent illumination modules configured for illuminating and displaying street message name signs;
   e) Configuring the at least one host controller, and the configuration including the system acceptance criteria and the system control algorithm;
   f) Configuring the power source to the system, and the power source maintaining operation of selected devices within the system during a power outage;
   g) Configuring sensors within the community for monitoring status of the community and providing the status to the host controller, and the status of the community including status of units identified by the illuminated street address signs and status of streets identified by the illuminated street signs;
   h) Configuring interface for an authorized operator for monitoring and entering into the host controller status of the community, and the status of the community including status of units identified by the illuminated street address signs and status of streets identified by the illuminated street signs and message signs;
i) Configuring the interface, including the interface between the devices of the system and the interface between the system and at least one external controller outside the system; said external controller including a remote host controller, a remote portable device;
j) Configuring the acceptance criteria for the system;
k) Configuring and programming the controllers, including the host controller; said programming including a control algorithm;
l) Configuring the control algorithm including real-time controls of the devices within the system, and the algorithm including the interface of the system with an operator and the remote controllers;
m) Configuring the control algorithm including real-time controls sustaining operation of the system within the acceptance criteria;
n) Configuring the acceptance criteria, and the acceptance criteria including at least one control target;
o) Configuring the at least one control target including a single requirement or combination of the following requirements:
  1) Maintaining operation of the system within manufacturer specifications;
  2) improving visibility of the street signs within the community;
  3) Maintaining up-to-date status of available routes within the community;
  4) Based on the status of routes within the community identifying the route providing the shortest path between locations within the community identified by the system;
  5) Based on the status of routes within the community identifying the route requiring the shortest time in reaching between locations within the community identified by the system;
  6) Based on the status of the community displaying messages on the street message sign controlled by the system;
  7) Providing to an authorized user real-time visual navigation between locations within the community identified by the system;
  8) Downloading to a mobile device of an authorized user real-time navigation between locations within the community identified by the system;
  9) Based on the status of a unit within the community, controlling the system, including controls of the illuminated street address sign of the unit; said controls enhancing visibility of the street address sign of the unit; said controls providing visual effects reflecting the status of the unit within the community;
p) Configuring the system including configuration supporting operation of the system for closed-loop real-time controls without an operator assistance:

In this example the apparatus is configured to include the following major devices:

35—remote host controller, which is configured to monitor and control operation of the devices of the system, maintaining the system within manufacturer specifications and sustaining operation within predefined acceptance criteria; in general the host controller (35) configurations include configurations described in this application for a host controller;

29—intelligent illumination module configured as two character street address illuminated sign with number "13"; the module (29) can be attached to an unit within a building of the complex; the module (29) can be configured to visually indicate the status of the unit, and communicate the status to the host (35) over network (48); in general, the module (29) configurations include configurations described in this application for an intelligent illumination module configured as an intelligent illuminated street address sign;

37—intelligent illumination module configured as five character street address illuminated sign with number "17825"; the module (37) can be attached to a building within the complex; the module (37) can be configured to visually indicate the status of the building, and communicate the status to the host (35) over network (49); in general, the module (37) configurations include configurations described in this application for an intelligent illumination module configured as an intelligent illuminated street address sign;

200—intelligent illuminated module configured as illuminated street name sign "Main Street" including directional signs "left" and "right" arrows, described for FIGS. 10 and 11; the module (37) can be attached to a pole within the complex along the respective street or intersection of the streets within the complex; the module (200) can be configured to visually indicate the status of the street, and communicate the status to the host (35) over network (400); in general, the module (200) configurations include configurations described in this application for an intelligent illumination module configured as an intelligent illuminated street name sign;

48, 49, 400, 401—wireless interface of the system, providing interface between the host controller (35) and devices of the system as indicated respectively by device labels (29, 37, 200, 90), and providing interface between devices (29) and (37) within the system, as indicated by (50); in general, the interface configurations include configurations described in this application for an intelligent network, including wireless LAN, INTERNET, mobile devices;

Other components are labeled as follows:

39—Ambient light sensor of (37); in general the sensor (39) configurations include configurations described in this application for an ambient light sensor;

40—Proximity sensor of (37); in general the sensor (40) configurations include configurations described in this application for a proximity light sensor;

41—Wireless interface of (37) which can be configured to support wireless communications over required distances, including INTERNET. The wireless interface and communication protocol can be configured to industry standards, including compliance or compatibility with wireless security systems; in general, the interface configurations include configurations described in this application for an intelligent network, including wireless LAN, INTERNET, mobile devices;

42—Power backup source, including solar battery. The configuration of the apparatus (37) can include solar battery as the main power source, or as a backup power source. The location of the solar battery can be remote from the enclosure of the apparatus, with respective power connection between the solar battery and electronics within the enclosure of the apparatus: devices within the system can be configured to include a battery backup, including solar battery; for devices installed outdoors, the respective solar battery can be installed on the top of the enclosure; in general the power backup source (42) configurations include configurations described in this application for power sources for the apparatus;

45—Sensor configured for local wireless interface between (37) and local remote controller (46). The sensor configurations include IR, RF and mobile or cellular; in general the sensor (45) configurations include configurations described in this application for an interface sensor;

46—Local remote controller, which can be configured to include a number of control buttons enabling an authorized operator to execute a number of controls. Example of controls: illumination ON/OFF; illumination intensity; illumination colors; illumination dynamic effects, such as blinking, rolling colors; setting configuration parameters related to sensors, including ambient light, proximity; setting configuration parameters related to time-based events, including maximum duration of illumination power staying ON. The local remote controller can be configured to allow an authorized user in setting a visual state of (37) reflecting a status of the building or an unit within the building;

47—Area of the sign (37) which can be configured for illumination independent of the illumination associated with illumination of the street address number '17825', including configurations highlighting a status of the unit the sign is attached to.

90—Intelligent illuminated street message sign, which is configured to display dynamic messages (91) under control of the controller (35) via network connection (401); an example of the message is shown.

Configurations of the apparatus and components within apparatus shown on FIG. 18 include configurations of the apparatus and its components described in this application.

Figures 19, 20:
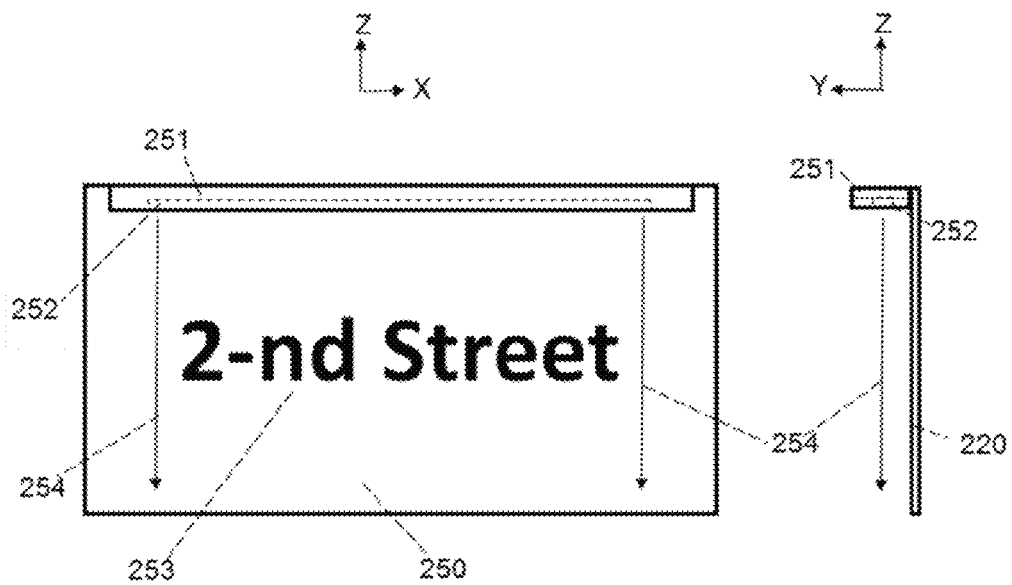

FIG. 19 illustrates details of an apparatus (250) configured as an intelligent illuminated street sign, which is further configured to include a single enclosure (251) to house solid state illumination devices (252) for illuminating the street name "2-nd Street" (253). The illumination solid state devices (252) include LED's, which provide parallel view illumination. In the example, the LED strip (252) is generating illumination along the direction (254) providing illumination of the street name panel (250), labeled "2-nd Street" in this example The LED strip (252) configurations include: number and type of LED's; single color or RGB; rated power; illumination intensity; operating environment; supported control functions, including special effects of blinking. The configuration of the enclosure of the apparatus (250) allows the light generated by LED's (252) in the direction (254) to provide general illumination of the area underneath the sign (250). The configurations of the apparatus (250) include configurations described for the apparatus (100) shown on FIG. 7. For simplicity not all components are shown. Configurations of the apparatus and components within apparatus shown on FIG. 19 include configurations of the apparatus and its components described in this application.

FIG. 20 illustrates details of the side view of the apparatus (250) shown on FIG. 19. Elements are labeled same as on FIG. 19.

Figure 21:
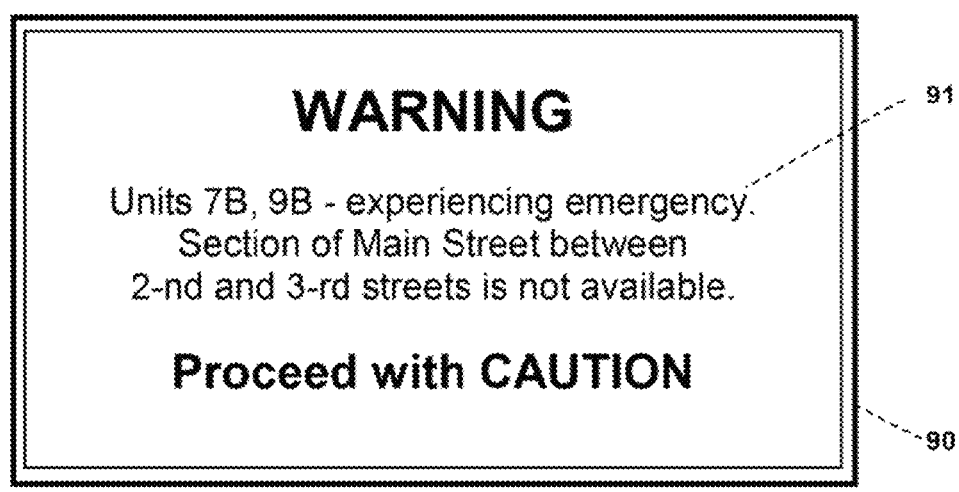

FIG. 21 illustrates example of an apparatus configured as an illuminated message sign (90), which is controlled in real time by the apparatus controller. The controller will display in real-time message transmitted via system network by the apparatus host controller (not shown). Example of the dynamic message as WARNING is shown via (91). The message sign (90) illumination parameters, including: colors for backlighting and lettering (91), dynamic effects, font size for lettering (91), can be selected by the controller to achieve the respective acceptance criteria. The configuration of the message sign, including location and size, can be configured to achieve the respective acceptance criteria.

Figure 22:

FIG. 22 illustrates example of an apparatus configured as an illuminated message sign (90), which is controlled in real time by the apparatus controller. The controller will display in real-time message transmitted via system network by the apparatus host controller (not shown). Example of the dynamic ATTENTION message is shown via (92). The message sign (90) illumination parameters, including: colors for backlighting and lettering (92), dynamic effects, font size for lettering (92), can be selected by the controller in real-time to achieve the respective acceptance criteria. The configuration of the message sign, including location and size, can be configured to achieve the respective acceptance criteria.

Figures 23, 24:
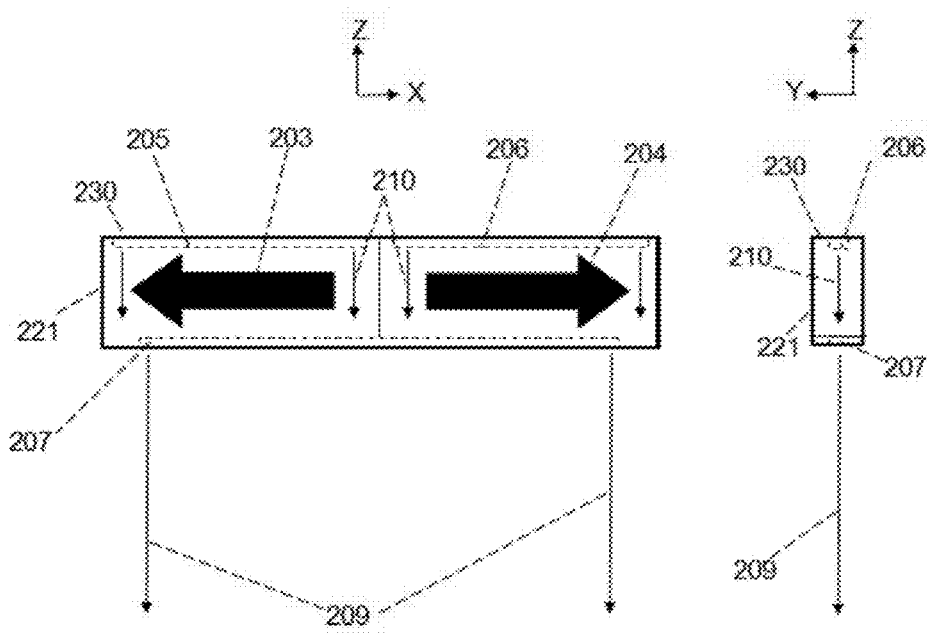

FIG. 23 illustrates details of an apparatus (230) configured as an intelligent illuminated street two direction sign. The enclosure configured with a section for housing the illuminated directional signs, shown as "left arrow" (203) and "right arrow" (204). The illumination solid state devices include LED's, which provide parallel view illumination. In the example, the LED strip (205) is generating illumination along the direction (210) providing illumination of the "left arrow" (203), the LED strip (206) is generating illumination along the direction (210) providing illumination of the "right arrow" (204), and the LED strip (207) is generating illumination along the direction (209) providing general illumination of the area underneath the sign.

Configurations of the apparatus and components within apparatus shown on FIG. 23 include configurations of the apparatus and its components described in this application. Remaining elements are labeled as on FIG. 12

FIG. 24 illustrates details of the side view of the apparatus (230) shown on FIG. 23. Elements are labeled same as on FIG. 23.

Figure 25:
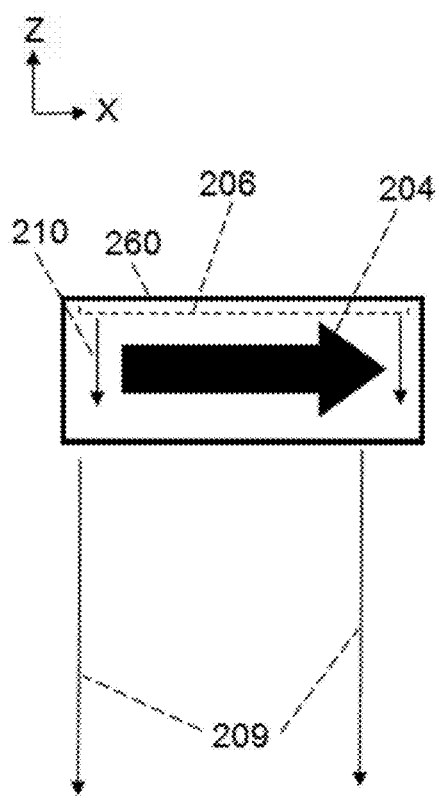

FIG. 25 illustrates details of an apparatus (260) configured as an intelligent illuminated street single direction sign. The enclosure configured with a section for housing the illuminated directional signs, shown as "right arrow" (204). The illumination solid state devices include LED's, which provide parallel view illumination. In the example, the LED strip (206) is generating illumination along the direction (210) providing illumination of the "right arrow" (204), and the LED strip (207) is generating illumination along the direction (209) providing general illumination of the area underneath the sign.

Configurations of the apparatus and components within apparatus shown on FIG. 25 include configurations of the apparatus and its components described in this application.

Figure 26:
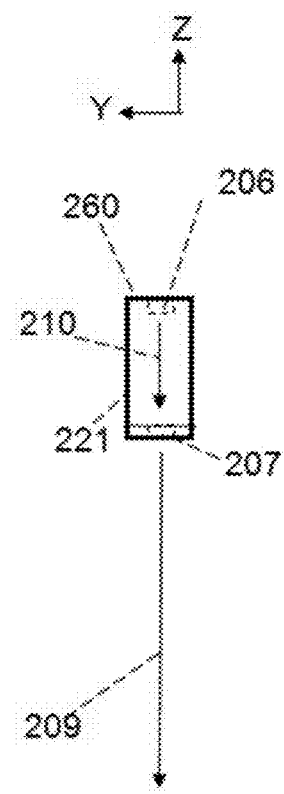

FIG. 26 illustrates details of the side view of the apparatus (260) shown on FIG. 25. Elements are labeled same as on FIG. 25.

The invention claimed is:

1. An intelligent modular configurable apparatus comprising:
    at least one configurable intelligent illumination module;
    at least one configurable solid-state light source;
    at least one configurable display;
    at least one configurable sensor;
    at least one configurable power source;
    at least one configurable module controller;
    at least one configurable host controller;
    at least one configurable network;
    at least one configurable acceptance criteria;

wherein the at least one intelligent illumination module is configured to provide illumination, including illumination for the at least one configurable display;

wherein the at least one solid-state light source is configured to provide illumination for the at least one illumination module; said light source providing illumination in a direction which is substantially parallel to an observer standing in front of the illumination module of the apparatus;

wherein the at least one sensor is configured to monitor environment, including environment within the apparatus; said environment including ambient light, temperature, power source;

wherein the at least one module controller is configured to connect with the at least one solid-state light source; said controller is further configured for monitoring and controlling operation of the light source;

wherein the at least one module controller is configured to connect with the at least one sensor; said controller is further configured for monitoring status of the sensor;

wherein the at least one power source is configured to power the apparatus; said power source configurations include conventional DC power supply, battery, and solar battery;

wherein the at least one module controller is configured to execute a control algorithm; said control algorithm includes configuration of the algorithm maintaining operation of the apparatus within the at least one acceptance criteria; said acceptance criteria include status and trigger level points for the sensors, which are used by the algorithm and the controller, and maintain operation of the apparatus within acceptance criteria; said acceptance criteria are configured to include specifications parameters of components comprising the apparatus; said control algorithm includes configuration supporting use of the components comprising the apparatus within the respective component specification requirements;

wherein the at least one host controller is configured to execute system control algorithm; said system control algorithm includes interface between the at least one host controller and the at least one module controller; said interface including the at least one configurable network; said system control algorithm includes configuration maintaining operation of the apparatus within the at least one acceptance criteria;

wherein the at least one acceptance criteria includes configuration criteria for a device within the apparatus; said device includes the at least one intelligent illuminated module;

wherein a system comprises of devices of the apparatus; said system including the at least one host controller, the at least one intelligent illuminated module, and the at least one network;

wherein the at least one acceptance criteria includes configuration of a system acceptance criteria for the apparatus; said system acceptance criteria include configuration requiring a coordinated control of the devices within the apparatus, and the system providing visual real-time navigation between the intelligent illuminated modules; said system acceptance criteria include configuration minimizing distance of the visual navigation between the intelligent illuminated modules; said system acceptance criteria include configuration minimizing time of the visual navigation between the intelligent illuminated modules; said system control algorithm including configuration maintaining operation of the apparatus within acceptance criteria;

wherein the apparatus is installed in a community; said community includes: an area within a city, a condominium complex; an apartment building; a residential unit; a commercial complex.

2. The intelligent apparatus of claim 1 further comprising; the at least one intelligent illumination module configuration including illuminated street name sign; said illuminated street name sign further comprising configuration including street direction indicators.

3. The intelligent apparatus of claim 1 further comprising; the at least one intelligent illumination module configuration including illuminated street address sign;

said illuminated street address sign further comprising configuration including address status indicators.

4. The intelligent apparatus of claim 1 further comprising; the at least one intelligent illumination module configuration including illuminated street message sign;

said illuminated street message sign further comprising configuration including display of static message and configuration displaying real-time dynamic message.

5. The intelligent apparatus of claim 1 further comprising; the at least one intelligent system controller configuration including system control of illumination modules over the network; said system control further comprising configuration including visual navigation between the illumination modules.

6. A method of improving safety within a community, and the method including the at least one intelligent modular configurable apparatus, and the method consisting of;

configuring the at least one solid-state light source for real-time controls by the at least one intelligent illumination module and providing illumination in a direction which is substantially parallel to an observer standing in front of the illumination module of the apparatus;

configuring a number of the sensors of the apparatus for monitoring ambient environment, including: lighting and temperature;

configuring a number of the sensors of the apparatus for detecting a motion of an object;

configuring a number of the sensors of the apparatus for video surveillance;

configuring a number of the sensors of the apparatus for detecting audio signals;

configuring a number of the sensors of the apparatus for monitoring electrical parameters of the apparatus including: voltage and current;

configuring a number of the sensors of the apparatus for a trigger point: said configuration of the sensors including the real-time configurations is stored in a non-volatile memory;

configuring a number of the sensors of the apparatus for interfacing with the network and the sensors communicating status in real-time to the module controller and/or the host controller;

configuring the network for wired and/or wireless communications; said wireless communication including: INTERNET, infra-red, RF, mobile, cellular, audio and voice;

configuring the acceptance criteria in a prioritized order and the criteria comprising of at least one control target for the apparatus:

a) maintaining operation within a specification including manufacturer specification of components of the apparatus, b) improving visibility of a street sign within a community,
c) maintaining up-to-date status of available routes within the community,
d) based on status of routes within the community identifying the route providing the shortest path between locations within the community,
e) based on the status of routes within the community identifying the route requiring the shortest time in reaching between locations within the community,
f) based on the status of the community displaying messages on the street message sign,
g) providing to an authorized user real-time visual navigation between locations within the community,
h) downloading over the network to a mobile device of an authorized user real-time navigation between locations within the community,
i) based on the status of a unit within the community illuminating the street address sign of the unit,
j) providing real time navigation respondent crew or a number of first responders attending to an emergency or emergencies within a complex with an objective to minimize the response time of each first respondent team in a priority order determined by a remote host controller based on the host controller acceptance criteria including the state of emergency;

configuring the apparatus as a dosed-loop control system for the system executing controls in real-time based on one or combination of:
 a) the status provided by the sensors,
 b) a time elapsed of a real-time dock of the apparatus and/or real-time clock communicated by a remote controller,
 c) real-time instructions communicated over the network by an operator and/or a remote host controller,
and the system executing real-time control algorithm and sustaining operation of the apparatus within the acceptance criteria; said configuration of the apparatus including real-time configurations is stored in the non-volatile memory of the apparatus;

configuring the at least one intelligent illumination module for illuminating a configurable street sign; said sign configuration including street name sign, street address sign; street message sign;

configuring the at least one power source to provide power to the at least one intelligent illumination module during a power outage;

configuring the at least one module controller for monitoring status of ambient environment; said controller monitoring status of the module, including self-diagnostics of electronics within the module; said controller executing controls, including the controls of the at least one solid state illumination source of the module;

said configurations of the apparatus including configurations in real-time by an operator and/or the host controller communicating with the apparatus over the network are stored in a non-volatile memory of the apparatus;

programming the least one configurable intelligent illumination module; said programming including a configuration and a control algorithm; said programming including programming in real-time and comprising of one or combination of;
 a) an operator performing predefined timed sequences of interrupting the light to the ambient light sensor of the apparatus,
 b) operator using a mobile device and the communicating with the apparatus over the network,
 c) the host controller using the network and communicating with the apparatus;
said configuration including the acceptance criteria; said control algorithm including control of the module sustaining operation of the module within the acceptance criteria.

7. The method of claim 6 improving safety within a community further comprising; wherein the acceptance criteria include: sustaining operation of components of the apparatus and the apparatus itself within the manufacturer specifications; detecting status when a stand-by power source is connected, and when the power source is a battery, optimizing use of the power source extending operation life of the battery; monitoring ambient environment, including temperature and light; detecting status when ambient temperature is above a level, and depending on the level, adjusting control of the module, including control of the illumination of the module for visual indication of the status; detecting status when ambient temperature is below a low temperature level, and depending on the level, adjusting control of the module, including control of the illumination of the module for extending operation of the module to the low temperature level.

8. The method of claim 6 improving safety within a community further comprising; wherein the configuration of the apparatus, including the configuration of the acceptance criteria entered by an operator, and the entry process by the operator includes operator executing a pre-defined sequences changing a state of a sensor, including interrupting the ambient light to the ambient light sensor and affecting status of the ambient light sensor, and the entry process includes operator interrupting the ambient light within a predefined time window after power is applied to the apparatus.

9. A method of reducing response time of first responders attending an emergency within a community, and the method including the at least one intelligent modular configurable apparatus, and the method consisting of;

programming the apparatus: said programming including programming of a at least one device within the apparatus, and programming of at least one system within the apparatus; said system comprising system devices, including a system controller; said programming including system configuration and control algorithm; said system configuration including system acceptance criteria; said system control algorithm including sustaining operation of the system within the acceptance criteria; said programming including operator; said control algorithm including configuration of an interface between the system controller and the at least one intelligent illumination module; said interface including wireless network for mobile devices, LAN and INTERNET;

configuring the system for providing real-time visual navigation within a community;

said navigation including configuration of the devices within the system; said devices including the at least one intelligent illumination module; said intelligent illumination module is a configurable street sign; said sign configuration including street name sign, street address sign, street directional sign, street message sign; said configuration including:
 a) Identifying within the community location of street name signs which are not clearly visible during evening and night hours, and installing the intelligent illumination modules configured for illuminating street name signs;
b) Identifying within the community location of street address signs which are not clearly visible during evening and night hours, and installing the intelligent illumination modules configured for illuminating street address signs;
c) Identifying within the community location of street intersections which are riot clearly visible during evening and night hours, and installing the intelligent illumination modules configured for illuminating street name signs, and the street name signs including illuminated directional signs;
d) Identifying within the community location and installing the intelligent illuminated message sign, and the message sign including static and dynamic messaging, and dynamic messaging including real-time text displayed by the message sign under control of the system controller;
e) Configuring the at least one host controller, and the configuration including the system acceptance criteria and the system control algorithm;
f) Configuring the power source to the system, and the power source maintaining operation of selected devices within the system during a power outage;
g) Configuring sensors within the community for monitoring status of the community and providing the status to the host controller, and the status of the community including status of units identified by the illuminated street address signs and status of streets identified by the illuminated street signs;
h) Configuring interface for an authorized operator for monitoring and entering into the host controller status of the community, and the status of the community including status of units identified by the illuminated street address signs and status of streets identified by the illuminated street signs;
i) Configuring the interface, including the interface between the devices of the system and the interface between the system and at least one external controller outside the system; said external controller including a remote host controller, a remote portable device;
j) Configuring the acceptance criteria for the system;
k) Configuring and programming the controllers, including the host controller; said programming including a control algorithm;
l) Configuring the control algorithm including real-time controls of the devices within the system, and the algorithm including the interface of the system with an operator and the remote controllers;
m) Configuring the control algorithm including real-time controls sustaining operation of the system within the acceptance criteria;
n) Configuring the acceptance criteria, and the acceptance criteria including at least one control target;
o) Configuring the at least one control target including a single requirement or combination of the following requirements:
  1) Maintaining operation of the system within manufacturer specifications;
  2) improving visibility of the street signs within the community;
  3) Maintaining up-to-date status of available routes within the community;
  4) Based on the status of routes within the community identifying the route providing the shortest path between locations within the community identified by the system;
  5) Based on the status of routes within the community identifying the route requiring the shortest time in reaching between locations within the community identified by the system;
  6) Providing to an authorized user real-time visual navigation between locations within the community identified by the system;
  7) Downloading to a mobile device of an authorized user real-time navigation between locations within the community identified by the system;
  8) Based on the status of a unit within the community, controlling the system, including controls of the illuminated street address sign of the unit; said controls enhancing visibility of the street address sign of the unit; said controls providing visual effects reflecting the status of the unit within the community;
  9) Displaying messages on the intelligent illuminated message signs, and the message configuration includes information of the community status;
p) Configuring the system including system configuration supporting operation of the system for closed-loop real-time controls, and the system without an operator assistance operating within configured acceptance criteria.

10. The method of claim 9 further comprising; wherein the controller of the apparatus maintains operation of the apparatus within the acceptance criteria.

11. The method of claim 9 further comprising; wherein the acceptance criteria for the apparatus are configured to include a target requiring optimization of using energy resources, which are providing power to the apparatus.

12. The method of claim 9 further comprising; wherein the acceptance criteria for the apparatus are configured to include a target maintaining operation of the apparatus within the limitations set by the apparatus specifications.

13. The method of claim 9 further comprising; wherein the apparatus is configured for a community, and the acceptance criteria for the apparatus are configured to include a target requiring the apparatus maintaining the status of the community, and the apparatus configuring the street message signs to display information based on the status of the community.

14. The method of claim 9 further comprising; wherein the apparatus is configured for a community, and the acceptance criteria for the apparatus are configured to include a target requiring the apparatus maintaining the status of the community, including the status of the streets and the units within the community, which are respectively identified by the illuminated street name signs and the illuminated street address signs.

15. The method of claim 9 further comprising; wherein the apparatus is configured for a community, and the acceptance criteria for the apparatus are configured to include a target requiring the apparatus maximizing the apparatus contribution toward safety of the community, including the apparatus interfacing and communicating with other safety monitoring and control systems, including the other systems installed within the community and the other systems installed outside of the community.

16. The method of claim 9 further comprising; wherein the acceptance criteria for the apparatus are configured to include a target requiring the apparatus calculating an optimum route between locations identified by the devices of the apparatus; and configuration of the optimum route including shortest distance or minimum time.

17. The method of claim 9 further comprising; wherein the acceptance criteria for the apparatus are configured to include a target requiring the apparatus providing real-time navigation to an authorized operator, and the real-time navigation including visual control of devices of the apparatus, leading the operator along an optimum route between locations identified by the devices of the apparatus, and configuration of the optimum route including shortest distance or minimum time.

18. The method of claim 9 further comprising; wherein the acceptance criteria for the apparatus are configured to include a target requiring the apparatus upon receiving a request from an authorized operator, the apparatus downloading over a network real -time navigation calculated by the apparatus, and the network supporting mobile devices, INTERNET.

19. The method of claim 9 further comprising; wherein the acceptance criteria for the apparatus are configured to include a target requiring the apparatus compliance to local ordinances of a community the apparatus is installed.

20. The method of claim 9 further comprising; wherein the acceptance criteria for the apparatus are configured to include a target requiring the apparatus operating a real-time closed-loop control system, and the apparatus executing the control algorithm without operator assistance.

21. The method of claim 9 further comprising; wherein the acceptance criteria for the apparatus are configured to include apparatus interfacing and communicating with a system within and/or outside a complex, including: security system, emergency system including 911, and the apparatus providing the first responders with real-time navigation in a form of intelligent illuminated signs including: street directional, street names, unit address number and street message signs, and the signs are clearly visible during evening and night hours assisting the first responders to reach the target location within the complex as soon as practically possible reducing the response time of the first responders.

\* \* \* \* \*